(12) United States Patent
Li et al.

(10) Patent No.: US 11,715,143 B2
(45) Date of Patent: *Aug. 1, 2023

(54) NETWORK-BASED SYSTEM FOR SHOWING CARS FOR SALE BY NON-DEALER VEHICLE OWNERS

(71) Applicant: NIO Technology (Anhui) Co., Ltd., Hefei (CN)

(72) Inventors: William Li, Shanghai (CN); Chris Ricci, San Jose, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 457 days.

This patent is subject to a terminal disclaimer.

(21) Appl. No.: 16/824,498

(22) Filed: Mar. 19, 2020

(65) Prior Publication Data
US 2020/0258136 A1 Aug. 13, 2020

Related U.S. Application Data

(63) Continuation of application No. 15/202,013, filed on Jul. 5, 2016, now Pat. No. 10,692,126.

(60) Provisional application No. 62/256,533, filed on Nov. 17, 2015.

(51) Int. Cl.
*G06Q 30/0601* (2023.01)

(52) U.S. Cl.
CPC .............................. *G06Q 30/0623* (2013.01)

(58) Field of Classification Search
CPC ......... G06Q 30/06–0645; G06Q 30/08; G06Q 50/01; G16Y 10/00–90
See application file for complete search history.

(56) References Cited

U.S. PATENT DOCUMENTS

| | | | |
|---|---|---|---|
| 4,361,202 A | 11/1982 | Minovitch |
| 4,476,954 A | 10/1984 | Johnson et al. |
| 4,754,255 A | 6/1988 | Sanders et al. |
| 4,875,391 A | 10/1989 | Leising et al. |
| 5,136,498 A | 8/1992 | McLaughlin et al. |
| 5,204,817 A | 4/1993 | Yoshida |
| 5,363,306 A | 11/1994 | Kuwahara et al. |
| 5,508,689 A | 4/1996 | Rado et al. |
| 5,521,815 A | 5/1996 | Rose |
| 5,529,138 A | 6/1996 | Shaw et al. |

(Continued)

FOREIGN PATENT DOCUMENTS

| | | |
|---|---|---|
| CN | 1417755 | 5/2003 |
| CN | 1847817 | 10/2006 |

(Continued)

OTHER PUBLICATIONS

M. H. Au, J. K. Liu, J. Fang, Z. L. Jiang, W. Susilo and J. Zhou, "A New Payment System for Enhancing Location Privacy of Electric Vehicles," in IEEE Transactions on Vehicular Technology, vol. 63, No. 1, pp. 3-18, Jan. 2014, doi: 10.1109/TVT.2013.2274288. (Year: 2014).*

(Continued)

*Primary Examiner* — Adam L Levine
(74) *Attorney, Agent, or Firm* — Sheridan Ross PC

(57) ABSTRACT

A method and apparatus for selling and servicing cars using a network of existing owners of the car and a network of existing independent car service centers and a distributed linked computer communication system.

20 Claims, 11 Drawing Sheets

(56) References Cited

U.S. PATENT DOCUMENTS

| | | |
|---|---|---|
| 5,531,122 A | 7/1996 | Chatham et al. |
| 5,572,450 A | 11/1996 | Worthy |
| 5,610,821 A | 3/1997 | Gazis et al. |
| 5,648,769 A | 7/1997 | Sato et al. |
| 5,710,702 A | 1/1998 | Hayashi et al. |
| 5,794,164 A | 8/1998 | Beckert et al. |
| 5,797,134 A | 8/1998 | McMillan et al. |
| 5,812,067 A | 9/1998 | Bergholz et al. |
| 5,825,283 A | 10/1998 | Camhi |
| 5,838,251 A | 11/1998 | Brinkmeyer et al. |
| 5,847,661 A | 12/1998 | Ricci |
| 5,890,080 A | 3/1999 | Coverdill et al. |
| 5,928,294 A | 7/1999 | Zelinkovsky |
| 5,949,345 A | 9/1999 | Beckert et al. |
| 5,983,161 A | 11/1999 | Lemelson et al. |
| 5,986,575 A | 11/1999 | Jones et al. |
| 6,038,426 A | 3/2000 | Williams, Jr. |
| 6,081,756 A | 6/2000 | Mio et al. |
| D429,684 S | 8/2000 | Johnson |
| 6,128,003 A | 10/2000 | Smith et al. |
| 6,141,620 A | 10/2000 | Zyburt et al. |
| 6,148,261 A | 11/2000 | Obradovich et al. |
| 6,152,514 A | 11/2000 | McLellen |
| 6,157,321 A | 12/2000 | Ricci |
| 6,198,996 B1 | 3/2001 | Berstis |
| 6,199,001 B1 | 3/2001 | Ohta et al. |
| 6,202,008 B1 | 3/2001 | Beckert et al. |
| 6,252,544 B1 | 6/2001 | Hoffberg |
| 6,267,428 B1 | 7/2001 | Baldas et al. |
| 6,302,438 B1 | 10/2001 | Stopper, Jr. et al. |
| 6,310,542 B1 | 10/2001 | Gehlot |
| 6,317,058 B1 | 11/2001 | Lemelson et al. |
| 6,339,826 B2 | 1/2002 | Hayes, Jr. et al. |
| 6,356,838 B1 | 3/2002 | Paul |
| 6,388,579 B1 | 5/2002 | Adcox et al. |
| 6,480,224 B1 | 11/2002 | Brown |
| 6,502,022 B1 | 12/2002 | Chastain et al. |
| 6,519,519 B1 | 2/2003 | Stopczynski |
| 6,557,752 B1 | 5/2003 | Yacoob |
| 6,563,910 B2 | 5/2003 | Menard et al. |
| 6,587,739 B1 | 7/2003 | Abrams et al. |
| 6,598,227 B1 | 7/2003 | Berry et al. |
| 6,607,212 B1 | 8/2003 | Reimer et al. |
| 6,617,981 B2 | 9/2003 | Basinger |
| 6,662,077 B2 | 12/2003 | Haag |
| 6,675,081 B2 | 1/2004 | Shuman et al. |
| 6,678,747 B2 | 1/2004 | Goossen et al. |
| 6,681,176 B2 | 1/2004 | Funk et al. |
| 6,690,260 B1 | 2/2004 | Ashihara |
| 6,690,940 B1 | 2/2004 | Brown et al. |
| 6,724,920 B1 | 4/2004 | Berenz et al. |
| 6,754,580 B1 | 6/2004 | Ask et al. |
| 6,757,593 B2 | 6/2004 | Mori et al. |
| 6,762,684 B1 | 7/2004 | Camhi |
| 6,765,495 B1 | 7/2004 | Dunning et al. |
| 6,778,888 B2 | 8/2004 | Cataldo et al. |
| 6,782,240 B1 | 8/2004 | Tabe |
| 6,785,531 B2 | 8/2004 | Lepley et al. |
| 6,816,783 B2 | 11/2004 | Hashima et al. |
| 6,820,259 B1 | 11/2004 | Kawamata et al. |
| 6,944,533 B2 | 9/2005 | Obradovich et al. |
| 6,950,022 B2 | 9/2005 | Breed |
| 6,958,707 B1 | 10/2005 | Siegel |
| 6,992,580 B2 | 1/2006 | Kotzin et al. |
| 7,019,641 B1 | 3/2006 | Lakshmanan et al. |
| 7,020,544 B2 | 3/2006 | Shinada et al. |
| 7,021,691 B1 | 4/2006 | Schmidt et al. |
| 7,042,345 B2 | 5/2006 | Ellis |
| 7,047,129 B2 | 5/2006 | Uotani |
| 7,058,898 B2 | 6/2006 | McWalter et al. |
| 7,096,431 B2 | 8/2006 | Tambata et al. |
| 7,142,696 B1 | 11/2006 | Engelsberg et al. |
| 7,164,117 B2 | 1/2007 | Breed et al. |
| 7,187,947 B1 | 3/2007 | White et al. |
| 7,203,598 B1 | 4/2007 | Whitsell |
| 7,233,861 B2 | 6/2007 | Van Buer et al. |
| 7,239,960 B2 | 7/2007 | Yokota et al. |
| 7,277,454 B2 | 10/2007 | Mocek et al. |
| 7,284,769 B2 | 10/2007 | Breed |
| 7,289,645 B2 | 10/2007 | Yamamoto et al. |
| 7,295,921 B2 | 11/2007 | Spencer et al. |
| 7,313,547 B2 | 12/2007 | Mocek et al. |
| 7,333,012 B1 | 2/2008 | Nguyen |
| 7,343,148 B1 | 3/2008 | O'Neil |
| 7,386,376 B2 | 6/2008 | Basir et al. |
| 7,386,799 B1 | 6/2008 | Clanton et al. |
| 7,432,829 B2 | 10/2008 | Poltorak |
| 7,474,264 B2 | 1/2009 | Bolduc et al. |
| 7,493,140 B2 | 2/2009 | Michmerhuizen et al. |
| 7,526,539 B1 | 4/2009 | Hsu |
| 7,548,815 B2 | 6/2009 | Watkins et al. |
| 7,566,083 B2 | 7/2009 | Vitito |
| 7,606,660 B2 | 10/2009 | Diaz et al. |
| 7,606,867 B1 | 10/2009 | Singhal et al. |
| 7,643,913 B2 | 1/2010 | Taki et al. |
| 7,671,764 B2 | 3/2010 | Uyeki et al. |
| 7,680,596 B2 | 3/2010 | Uyeki et al. |
| 7,683,771 B1 | 3/2010 | Loeb |
| 7,711,468 B1 | 5/2010 | Levy |
| 7,734,315 B2 | 6/2010 | Rathus et al. |
| 7,748,021 B2 | 6/2010 | Obradovich et al. |
| RE41,449 E | 7/2010 | Krahnstoever et al. |
| 7,791,499 B2 | 9/2010 | Mohan et al. |
| 7,796,190 B2 | 9/2010 | Basso et al. |
| 7,802,832 B2 | 9/2010 | Carnevali |
| 7,821,421 B2 | 10/2010 | Tamir et al. |
| 7,832,762 B2 | 11/2010 | Breed |
| 7,864,073 B2 | 1/2011 | Lee et al. |
| 7,872,591 B2 | 1/2011 | Kane et al. |
| 7,873,471 B2 | 1/2011 | Gieseke |
| 7,881,703 B2 | 2/2011 | Roundtree et al. |
| 7,891,004 B1 | 2/2011 | Gelvin et al. |
| 7,891,719 B2 | 2/2011 | Carnevali |
| 7,899,610 B2 | 3/2011 | McClellan |
| 7,966,678 B2 | 6/2011 | Ten Eyck et al. |
| 7,969,290 B2 | 6/2011 | Waeller et al. |
| 7,969,324 B2 | 6/2011 | Chevion et al. |
| 8,060,631 B2 | 11/2011 | Collart et al. |
| 8,064,925 B1 | 11/2011 | Sun et al. |
| 8,066,313 B2 | 11/2011 | Carnevali |
| 8,098,170 B1 | 1/2012 | Szczerba et al. |
| 8,113,564 B2 | 2/2012 | Carnevali |
| 8,131,419 B2 | 3/2012 | Ampunan et al. |
| 8,157,310 B2 | 4/2012 | Carnevali |
| 8,162,368 B2 | 4/2012 | Carnevali |
| 8,175,802 B2 | 5/2012 | Forstall et al. |
| 8,233,919 B2 | 7/2012 | Haag et al. |
| 8,245,609 B1 | 8/2012 | Greenwald et al. |
| 8,306,514 B1 | 11/2012 | Nunally |
| 8,334,847 B2 | 12/2012 | Tomkins |
| 8,346,233 B2 | 1/2013 | Aaron et al. |
| 8,346,432 B2 | 1/2013 | Van Wiemeersch et al. |
| 8,350,721 B2 | 1/2013 | Carr |
| 8,352,282 B2 | 1/2013 | Jensen et al. |
| 8,369,263 B2 | 2/2013 | Dowling et al. |
| 8,417,449 B1 | 4/2013 | Denise |
| 8,432,260 B2 | 4/2013 | Talty et al. |
| 8,442,389 B2 | 5/2013 | Kashima et al. |
| 8,442,758 B1 | 5/2013 | Rovik et al. |
| 8,467,965 B2 | 6/2013 | Chang |
| 8,497,842 B2 | 7/2013 | Tomkins et al. |
| 8,498,809 B2 | 7/2013 | Bill |
| 8,509,982 B2 | 8/2013 | Montemerlo et al. |
| 8,521,410 B2 | 8/2013 | Mizuno et al. |
| 8,527,143 B2 | 9/2013 | Tan |
| 8,527,146 B1 | 9/2013 | Jackson et al. |
| 8,532,574 B2 | 9/2013 | Kirsch |
| 8,543,330 B2 | 9/2013 | Taylor et al. |
| 8,547,340 B2 | 10/2013 | Sizelove et al. |
| 8,548,669 B2 | 10/2013 | Naylor |
| 8,559,183 B1 | 10/2013 | Davis |
| 8,577,600 B1 | 11/2013 | Pierfelice |
| 8,578,279 B2 | 11/2013 | Chen et al. |
| 8,583,292 B2 | 11/2013 | Preston et al. |

(56) References Cited

U.S. PATENT DOCUMENTS

| | | |
|---|---|---|
| 8,589,073 B2 | 11/2013 | Guha et al. |
| 8,600,611 B2 | 12/2013 | Seize |
| 8,613,385 B1 | 12/2013 | Hulet et al. |
| 8,621,645 B1 | 12/2013 | Spackman |
| 8,624,727 B2 | 1/2014 | Saigh et al. |
| 8,634,984 B2 | 1/2014 | Sumizawa |
| 8,644,165 B2 | 2/2014 | Saarimaki et al. |
| 8,660,735 B2 | 2/2014 | Tengler et al. |
| 8,671,068 B2 | 3/2014 | Harber et al. |
| 8,688,372 B2 | 4/2014 | Bhogal et al. |
| 8,705,527 B1 | 4/2014 | Addepalli et al. |
| 8,706,143 B1 | 4/2014 | Elias |
| 8,718,797 B1 | 5/2014 | Addepalli et al. |
| 8,725,311 B1 | 5/2014 | Breed |
| 8,730,033 B2 | 5/2014 | Yarnold et al. |
| 8,737,986 B2 | 5/2014 | Rhoads et al. |
| 8,761,673 B2 | 6/2014 | Sakata |
| 8,774,842 B2 | 7/2014 | Jones et al. |
| 8,779,947 B2 | 7/2014 | Tengler et al. |
| 8,782,262 B2 | 7/2014 | Collart et al. |
| 8,793,065 B2 | 7/2014 | Seltzer et al. |
| 8,798,918 B2 | 8/2014 | Onishi et al. |
| 8,805,110 B2 | 8/2014 | Rhoads et al. |
| 8,812,171 B2 | 8/2014 | Filev et al. |
| 8,817,761 B2 | 8/2014 | Gruberman et al. |
| 8,825,031 B2 | 9/2014 | Aaron et al. |
| 8,825,277 B2 | 9/2014 | McClellan et al. |
| 8,825,382 B2 | 9/2014 | Liu |
| 8,826,261 B1 | 9/2014 | Anand AG et al. |
| 8,838,088 B1 | 9/2014 | Henn et al. |
| 8,862,317 B2 | 10/2014 | Shin et al. |
| 8,880,239 B2 | 11/2014 | Kleve et al. |
| 8,977,408 B1 | 3/2015 | Cazanas et al. |
| 9,043,016 B2 | 5/2015 | Filippov et al. |
| 9,229,905 B1 | 1/2016 | Penilla et al. |
| 9,499,128 B2 | 11/2016 | Reh et al. |
| 2001/0010516 A1 | 8/2001 | Roh et al. |
| 2001/0015888 A1 | 8/2001 | Shaler et al. |
| 2002/0009978 A1 | 1/2002 | Dukach et al. |
| 2002/0023010 A1 | 2/2002 | Rittmaster et al. |
| 2002/0026278 A1 | 2/2002 | Feldman et al. |
| 2002/0045484 A1 | 4/2002 | Eck et al. |
| 2002/0065046 A1 | 5/2002 | Mankins et al. |
| 2002/0077985 A1 | 6/2002 | Kobata et al. |
| 2002/0095249 A1 | 7/2002 | Lang |
| 2002/0097145 A1 | 7/2002 | Tumey et al. |
| 2002/0103622 A1 | 8/2002 | Burge |
| 2002/0105968 A1 | 8/2002 | Pruzan et al. |
| 2002/0126876 A1 | 9/2002 | Paul et al. |
| 2002/0128774 A1 | 9/2002 | Takezaki et al. |
| 2002/0143461 A1 | 10/2002 | Burns et al. |
| 2002/0143643 A1 | 10/2002 | Catan |
| 2002/0152010 A1 | 10/2002 | Colmenarez et al. |
| 2002/0154217 A1 | 10/2002 | Ikeda |
| 2002/0169551 A1 | 11/2002 | Inoue et al. |
| 2002/0174021 A1 | 11/2002 | Chu et al. |
| 2003/0004624 A1 | 1/2003 | Wilson et al. |
| 2003/0007227 A1 | 1/2003 | Ogino |
| 2003/0055557 A1 | 3/2003 | Dutta et al. |
| 2003/0060937 A1 | 3/2003 | Shinada et al. |
| 2003/0065432 A1 | 4/2003 | Shuman et al. |
| 2003/0101451 A1 | 5/2003 | Bentolila et al. |
| 2003/0109972 A1 | 6/2003 | Tak |
| 2003/0125846 A1 | 7/2003 | Yu et al. |
| 2003/0132666 A1 | 7/2003 | Bond et al. |
| 2003/0149530 A1 | 8/2003 | Stopczynski |
| 2003/0158638 A1 | 8/2003 | Yakes et al. |
| 2003/0182435 A1 | 9/2003 | Redlich et al. |
| 2003/0202683 A1 | 10/2003 | Ma et al. |
| 2003/0204290 A1 | 10/2003 | Sadler et al. |
| 2003/0230443 A1 | 12/2003 | Cramer et al. |
| 2004/0017292 A1 | 1/2004 | Reese et al. |
| 2004/0024502 A1 | 2/2004 | Squires et al. |
| 2004/0036622 A1 | 2/2004 | Dukach et al. |
| 2004/0039500 A1 | 2/2004 | Amendola et al. |
| 2004/0039504 A1 | 2/2004 | Coffee et al. |
| 2004/0068364 A1 | 4/2004 | Zhao et al. |
| 2004/0070920 A1 | 4/2004 | Flueli |
| 2004/0093155 A1 | 5/2004 | Simonds et al. |
| 2004/0117494 A1 | 6/2004 | Mitchell et al. |
| 2004/0128062 A1 | 7/2004 | Ogino et al. |
| 2004/0153356 A1 | 8/2004 | Lockwood et al. |
| 2004/0162019 A1 | 8/2004 | Horita et al. |
| 2004/0180653 A1 | 9/2004 | Royalty |
| 2004/0182574 A1 | 9/2004 | Adnan et al. |
| 2004/0193347 A1 | 9/2004 | Harumoto et al. |
| 2004/0203974 A1 | 10/2004 | Seibel |
| 2004/0204837 A1 | 10/2004 | Singleton |
| 2004/0209594 A1 | 10/2004 | Naboulsi |
| 2004/0217850 A1 | 11/2004 | Perttunen et al. |
| 2004/0225557 A1 | 11/2004 | Phelan et al. |
| 2004/0255123 A1 | 12/2004 | Noyama et al. |
| 2004/0257208 A1 | 12/2004 | Huang et al. |
| 2004/0260470 A1 | 12/2004 | Rast |
| 2005/0012599 A1 | 1/2005 | DeMatteo |
| 2005/0031100 A1 | 2/2005 | Iggulden et al. |
| 2005/0038598 A1 | 2/2005 | Oesterling et al. |
| 2005/0042999 A1 | 2/2005 | Rappaport |
| 2005/0065678 A1 | 3/2005 | Smith et al. |
| 2005/0065711 A1 | 3/2005 | Dahlgren et al. |
| 2005/0086051 A1 | 4/2005 | Brulle-Drews |
| 2005/0093717 A1 | 5/2005 | Lilja |
| 2005/0097541 A1 | 5/2005 | Holland |
| 2005/0114864 A1 | 5/2005 | Surace |
| 2005/0122235 A1 | 6/2005 | Teffer et al. |
| 2005/0124211 A1 | 6/2005 | Diessner et al. |
| 2005/0130744 A1 | 6/2005 | Eck et al. |
| 2005/0144156 A1 | 6/2005 | Barber |
| 2005/0149752 A1 | 7/2005 | Johnson et al. |
| 2005/0153760 A1 | 7/2005 | Varley |
| 2005/0159853 A1 | 7/2005 | Takahashi et al. |
| 2005/0159892 A1 | 7/2005 | Chung |
| 2005/0192727 A1 | 9/2005 | Shostak et al. |
| 2005/0197748 A1 | 9/2005 | Holst et al. |
| 2005/0197767 A1 | 9/2005 | Nortrup |
| 2005/0251324 A1 | 11/2005 | Wiener et al. |
| 2005/0261815 A1 | 11/2005 | Cowelchuk et al. |
| 2005/0278093 A1 | 12/2005 | Kameyama |
| 2005/0283284 A1 | 12/2005 | Grenier et al. |
| 2006/0015819 A1 | 1/2006 | Hawkins et al. |
| 2006/0036358 A1 | 2/2006 | Hale et al. |
| 2006/0044119 A1 | 3/2006 | Egelhaaf |
| 2006/0047386 A1 | 3/2006 | Kanevsky et al. |
| 2006/0058948 A1 | 3/2006 | Blass et al. |
| 2006/0059229 A1 | 3/2006 | Bain et al. |
| 2006/0125631 A1 | 6/2006 | Sharony |
| 2006/0129691 A1* | 6/2006 | Coffee ............... H04L 67/04 709/230 |
| 2006/0130033 A1 | 6/2006 | Stoffels et al. |
| 2006/0142933 A1 | 6/2006 | Feng |
| 2006/0173841 A1 | 8/2006 | Bill |
| 2006/0175403 A1 | 8/2006 | McConnell et al. |
| 2006/0184319 A1 | 8/2006 | Seick et al. |
| 2006/0212909 A1 | 9/2006 | Girard et al. |
| 2006/0241836 A1 | 10/2006 | Kachouh et al. |
| 2006/0243056 A1 | 11/2006 | Sundermeyer et al. |
| 2006/0250272 A1 | 11/2006 | Puamau |
| 2006/0253307 A1 | 11/2006 | Warren et al. |
| 2006/0259210 A1 | 11/2006 | Tanaka et al. |
| 2006/0274829 A1 | 12/2006 | Siemens et al. |
| 2006/0282204 A1 | 12/2006 | Breed |
| 2006/0287807 A1 | 12/2006 | Teffer |
| 2006/0287865 A1 | 12/2006 | Cross et al. |
| 2006/0288382 A1 | 12/2006 | Vitito |
| 2006/0290516 A1 | 12/2006 | Muehlsteff et al. |
| 2007/0001831 A1 | 1/2007 | Raz et al. |
| 2007/0002032 A1 | 1/2007 | Powers et al. |
| 2007/0010942 A1 | 1/2007 | Bill |
| 2007/0015485 A1 | 1/2007 | DeBiasio et al. |
| 2007/0028370 A1 | 2/2007 | Seng |
| 2007/0032225 A1 | 2/2007 | Konicek et al. |
| 2007/0057781 A1 | 3/2007 | Breed |
| 2007/0061057 A1 | 3/2007 | Huang et al. |
| 2007/0067614 A1 | 3/2007 | Berry et al. |

(56) References Cited

U.S. PATENT DOCUMENTS

| | | |
|---|---|---|
| 2007/0069880 A1 | 3/2007 | Best et al. |
| 2007/0083298 A1 | 4/2007 | Pierce et al. |
| 2007/0088488 A1 | 4/2007 | Reeves et al. |
| 2007/0103328 A1 | 5/2007 | Lakshmanan et al. |
| 2007/0115101 A1 | 5/2007 | Creekbaum et al. |
| 2007/0118301 A1 | 5/2007 | Andarawis et al. |
| 2007/0120697 A1 | 5/2007 | Ayoub et al. |
| 2007/0135995 A1 | 6/2007 | Kikuchi et al. |
| 2007/0156317 A1 | 7/2007 | Breed |
| 2007/0182625 A1 | 8/2007 | Kerai et al. |
| 2007/0182816 A1 | 8/2007 | Fox |
| 2007/0185969 A1 | 8/2007 | Davis |
| 2007/0192486 A1 | 8/2007 | Wilson et al. |
| 2007/0194902 A1 | 8/2007 | Blanco et al. |
| 2007/0194944 A1 | 8/2007 | Galera et al. |
| 2007/0195997 A1 | 8/2007 | Paul et al. |
| 2007/0200663 A1 | 8/2007 | White et al. |
| 2007/0208860 A1 | 9/2007 | Zellner et al. |
| 2007/0213090 A1 | 9/2007 | Holmberg |
| 2007/0228826 A1 | 10/2007 | Jordan et al. |
| 2007/0233341 A1 | 10/2007 | Logsdon |
| 2007/0250228 A1 | 10/2007 | Reddy et al. |
| 2007/0257815 A1 | 11/2007 | Gunderson et al. |
| 2007/0276596 A1 | 11/2007 | Solomon et al. |
| 2007/0280505 A1 | 12/2007 | Breed |
| 2008/0005974 A1 | 1/2008 | Delgado Vazquez et al. |
| 2008/0023253 A1 | 1/2008 | Prost-Fin et al. |
| 2008/0027337 A1 | 1/2008 | Dugan et al. |
| 2008/0033635 A1 | 2/2008 | Obradovich et al. |
| 2008/0042824 A1 | 2/2008 | Kates |
| 2008/0051957 A1 | 2/2008 | Breed et al. |
| 2008/0052627 A1 | 2/2008 | Oguchi |
| 2008/0071465 A1 | 3/2008 | Chapman et al. |
| 2008/0082237 A1 | 4/2008 | Breed |
| 2008/0086455 A1 | 4/2008 | Meisels et al. |
| 2008/0090522 A1 | 4/2008 | Oyama |
| 2008/0104227 A1 | 5/2008 | Birnie et al. |
| 2008/0119994 A1 | 5/2008 | Kameyama |
| 2008/0129475 A1 | 6/2008 | Breed et al. |
| 2008/0143085 A1 | 6/2008 | Breed et al. |
| 2008/0147280 A1 | 6/2008 | Breed |
| 2008/0148374 A1 | 6/2008 | Spaur et al. |
| 2008/0154712 A1 | 6/2008 | Wellman |
| 2008/0154957 A1 | 6/2008 | Taylor et al. |
| 2008/0161986 A1 | 7/2008 | Breed |
| 2008/0164985 A1 | 7/2008 | Iketani et al. |
| 2008/0169940 A1 | 7/2008 | Lee et al. |
| 2008/0174451 A1 | 7/2008 | Harrington et al. |
| 2008/0212215 A1 | 9/2008 | Schofield et al. |
| 2008/0216067 A1 | 9/2008 | Villing |
| 2008/0228358 A1 | 9/2008 | Wang et al. |
| 2008/0234919 A1 | 9/2008 | Ritter et al. |
| 2008/0252487 A1 | 10/2008 | McClellan et al. |
| 2008/0253613 A1 | 10/2008 | Jones et al. |
| 2008/0255721 A1 | 10/2008 | Yamada |
| 2008/0255722 A1 | 10/2008 | McClellan et al. |
| 2008/0269958 A1 | 10/2008 | Filev et al. |
| 2008/0281508 A1 | 11/2008 | Fu |
| 2008/0300778 A1 | 12/2008 | Kuznetsov |
| 2008/0305780 A1 | 12/2008 | Williams et al. |
| 2008/0319602 A1 | 12/2008 | McClellan et al. |
| 2009/0006525 A1 | 1/2009 | Moore |
| 2009/0024419 A1 | 1/2009 | McClellan et al. |
| 2009/0037719 A1 | 2/2009 | Sakthikumar et al. |
| 2009/0040026 A1 | 2/2009 | Tanaka |
| 2009/0055178 A1 | 2/2009 | Coon |
| 2009/0082951 A1 | 3/2009 | Graessley |
| 2009/0099720 A1 | 4/2009 | Elgali |
| 2009/0112393 A1 | 4/2009 | Maten et al. |
| 2009/0112452 A1 | 4/2009 | Buck et al. |
| 2009/0119657 A1 | 5/2009 | Link, II |
| 2009/0125174 A1 | 5/2009 | Delean |
| 2009/0132294 A1 | 5/2009 | Haines |
| 2009/0138336 A1 | 5/2009 | Ashley et al. |
| 2009/0144622 A1 | 6/2009 | Evans et al. |
| 2009/0157312 A1 | 6/2009 | Black et al. |
| 2009/0158200 A1 | 6/2009 | Palahnuk et al. |
| 2009/0180668 A1 | 7/2009 | Jones et al. |
| 2009/0189373 A1 | 7/2009 | Schramm et al. |
| 2009/0189979 A1 | 7/2009 | Smyth |
| 2009/0195370 A1 | 8/2009 | Huffman et al. |
| 2009/0210257 A1 | 8/2009 | Chalfant et al. |
| 2009/0216935 A1 | 8/2009 | Flick |
| 2009/0222200 A1 | 9/2009 | Link et al. |
| 2009/0224931 A1 | 9/2009 | Dietz et al. |
| 2009/0224942 A1 | 9/2009 | Goudy et al. |
| 2009/0234578 A1 | 9/2009 | Newby et al. |
| 2009/0241883 A1 | 10/2009 | Nagoshi et al. |
| 2009/0254446 A1 | 10/2009 | Chernyak |
| 2009/0264849 A1 | 10/2009 | La Croix |
| 2009/0275321 A1 | 11/2009 | Crowe |
| 2009/0278750 A1 | 11/2009 | Man et al. |
| 2009/0278915 A1 | 11/2009 | Kramer et al. |
| 2009/0279839 A1 | 11/2009 | Nakamura et al. |
| 2009/0284359 A1 | 11/2009 | Huang et al. |
| 2009/0287405 A1 | 11/2009 | Liu et al. |
| 2009/0299572 A1 | 12/2009 | Fujikawa et al. |
| 2009/0312998 A1 | 12/2009 | Berckmans et al. |
| 2009/0319181 A1 | 12/2009 | Khosravy et al. |
| 2010/0008053 A1 | 1/2010 | Osternack et al. |
| 2010/0023204 A1 | 1/2010 | Basir et al. |
| 2010/0035620 A1 | 2/2010 | Naden et al. |
| 2010/0036560 A1 | 2/2010 | Wright et al. |
| 2010/0042498 A1 | 2/2010 | Schalk |
| 2010/0052945 A1 | 3/2010 | Breed |
| 2010/0057337 A1 | 3/2010 | Fuchs |
| 2010/0066498 A1 | 3/2010 | Fenton |
| 2010/0069115 A1 | 3/2010 | Liu |
| 2010/0070338 A1 | 3/2010 | Siotia et al. |
| 2010/0077094 A1 | 3/2010 | Howarter et al. |
| 2010/0087987 A1 | 4/2010 | Huang et al. |
| 2010/0090817 A1 | 4/2010 | Yamaguchi et al. |
| 2010/0097178 A1 | 4/2010 | Pisz et al. |
| 2010/0097239 A1 | 4/2010 | Campbell et al. |
| 2010/0097458 A1 | 4/2010 | Zhang et al. |
| 2010/0106344 A1 | 4/2010 | Edwards et al. |
| 2010/0106418 A1 | 4/2010 | Kindo et al. |
| 2010/0118025 A1 | 5/2010 | Smith et al. |
| 2010/0121570 A1 | 5/2010 | Tokue et al. |
| 2010/0121645 A1 | 5/2010 | Seitz et al. |
| 2010/0125387 A1 | 5/2010 | Sehyun et al. |
| 2010/0125405 A1 | 5/2010 | Chae et al. |
| 2010/0125811 A1 | 5/2010 | Moore et al. |
| 2010/0127847 A1 | 5/2010 | Evans et al. |
| 2010/0131300 A1 | 5/2010 | Collopy et al. |
| 2010/0134958 A1 | 6/2010 | Disaverio et al. |
| 2010/0136944 A1 | 6/2010 | Taylor et al. |
| 2010/0137037 A1 | 6/2010 | Basir |
| 2010/0144284 A1 | 6/2010 | Chutorash et al. |
| 2010/0145700 A1 | 6/2010 | Kennewick et al. |
| 2010/0145987 A1 | 6/2010 | Harper et al. |
| 2010/0152976 A1 | 6/2010 | White et al. |
| 2010/0169432 A1 | 7/2010 | Santori et al. |
| 2010/0174474 A1 | 7/2010 | Nagase |
| 2010/0179712 A1 | 7/2010 | Pepitone et al. |
| 2010/0185341 A1 | 7/2010 | Wilson et al. |
| 2010/0188831 A1 | 7/2010 | Ortel |
| 2010/0197359 A1 | 8/2010 | Harris |
| 2010/0202346 A1 | 8/2010 | Sitzes et al. |
| 2010/0211259 A1 | 8/2010 | McClellan |
| 2010/0211282 A1 | 8/2010 | Nakata et al. |
| 2010/0211300 A1 | 8/2010 | Jaffe et al. |
| 2010/0211304 A1 | 8/2010 | Hwang et al. |
| 2010/0211441 A1 | 8/2010 | Sprigg et al. |
| 2010/0217458 A1 | 8/2010 | Schweiger et al. |
| 2010/0222939 A1 | 9/2010 | Namburu et al. |
| 2010/0228404 A1 | 9/2010 | Link et al. |
| 2010/0234071 A1 | 9/2010 | Shabtay et al. |
| 2010/0235042 A1 | 9/2010 | Ying |
| 2010/0235744 A1 | 9/2010 | Schultz |
| 2010/0235891 A1 | 9/2010 | Oglesbee et al. |
| 2010/0250071 A1 | 9/2010 | Pala et al. |
| 2010/0253493 A1 | 10/2010 | Szczerba et al. |
| 2010/0256836 A1 | 10/2010 | Mudalige |

(56) References Cited

U.S. PATENT DOCUMENTS

| | | |
|---|---|---|
| 2010/0265104 A1 | 10/2010 | Zlojutro |
| 2010/0268426 A1 | 10/2010 | Pathak et al. |
| 2010/0274410 A1 | 10/2010 | Tsien et al. |
| 2010/0280751 A1 | 11/2010 | Breed |
| 2010/0287303 A1 | 11/2010 | Smith et al. |
| 2010/0289632 A1 | 11/2010 | Seder et al. |
| 2010/0289643 A1 | 11/2010 | Trundle et al. |
| 2010/0291427 A1 | 11/2010 | Zhou |
| 2010/0295676 A1 | 11/2010 | Khachaturov et al. |
| 2010/0304640 A1 | 12/2010 | Sofman et al. |
| 2010/0305807 A1 | 12/2010 | Basir et al. |
| 2010/0306080 A1 | 12/2010 | Trandal et al. |
| 2010/0306309 A1 | 12/2010 | Santori et al. |
| 2010/0306435 A1 | 12/2010 | Nigoghosian et al. |
| 2010/0315218 A1 | 12/2010 | Cades et al. |
| 2010/0321151 A1 | 12/2010 | Matsuura et al. |
| 2010/0325626 A1 | 12/2010 | Greschler et al. |
| 2010/0332130 A1 | 12/2010 | Shimizu et al. |
| 2011/0015853 A1 | 1/2011 | DeKock et al. |
| 2011/0018736 A1 | 1/2011 | Carr |
| 2011/0021213 A1 | 1/2011 | Carr |
| 2011/0021234 A1 | 1/2011 | Tibbits et al. |
| 2011/0028138 A1 | 2/2011 | Davies-Moore et al. |
| 2011/0035098 A1 | 2/2011 | Goto et al. |
| 2011/0035141 A1 | 2/2011 | Barker et al. |
| 2011/0040438 A1 | 2/2011 | Kluge et al. |
| 2011/0050589 A1 | 3/2011 | Yan et al. |
| 2011/0053506 A1 | 3/2011 | Lemke et al. |
| 2011/0077808 A1 | 3/2011 | Hyde et al. |
| 2011/0078024 A1 | 3/2011 | Messier et al. |
| 2011/0080282 A1 | 4/2011 | Kleve et al. |
| 2011/0082615 A1 | 4/2011 | Small et al. |
| 2011/0084824 A1 | 4/2011 | Tewari et al. |
| 2011/0090078 A1 | 4/2011 | Kim et al. |
| 2011/0092159 A1 | 4/2011 | Park et al. |
| 2011/0093154 A1 | 4/2011 | Moinzadeh et al. |
| 2011/0093158 A1 | 4/2011 | Theisen et al. |
| 2011/0093438 A1 | 4/2011 | Poulsen |
| 2011/0093846 A1 | 4/2011 | Moinzadeh et al. |
| 2011/0099036 A1 | 4/2011 | Sarkissian et al. |
| 2011/0105097 A1 | 5/2011 | Tadayon et al. |
| 2011/0106375 A1 | 5/2011 | Sundaram et al. |
| 2011/0112717 A1 | 5/2011 | Resner |
| 2011/0112969 A1 | 5/2011 | Zaid et al. |
| 2011/0117933 A1 | 5/2011 | Andersson |
| 2011/0119344 A1 | 5/2011 | Eustis |
| 2011/0130915 A1 | 6/2011 | Wright et al. |
| 2011/0134749 A1 | 6/2011 | Speks et al. |
| 2011/0137520 A1 | 6/2011 | Rector et al. |
| 2011/0145331 A1 | 6/2011 | Christie et al. |
| 2011/0172873 A1 | 7/2011 | Szwabowski et al. |
| 2011/0175754 A1 | 7/2011 | Karpinsky |
| 2011/0183658 A1 | 7/2011 | Zellner |
| 2011/0187520 A1 | 8/2011 | Filev et al. |
| 2011/0193707 A1 | 8/2011 | Ngo |
| 2011/0193726 A1 | 8/2011 | Szwabowski et al. |
| 2011/0195699 A1 | 8/2011 | Tadayon et al. |
| 2011/0197187 A1 | 8/2011 | Roh |
| 2011/0205047 A1 | 8/2011 | Patel et al. |
| 2011/0209079 A1 | 8/2011 | Tarte et al. |
| 2011/0210867 A1 | 9/2011 | Benedikt |
| 2011/0212717 A1 | 9/2011 | Rhoads et al. |
| 2011/0213629 A1 | 9/2011 | Clark et al. |
| 2011/0221656 A1 | 9/2011 | Haddick et al. |
| 2011/0224865 A1 | 9/2011 | Gordon et al. |
| 2011/0224898 A1 | 9/2011 | Scofield et al. |
| 2011/0225527 A1 | 9/2011 | Law et al. |
| 2011/0227757 A1 | 9/2011 | Chen et al. |
| 2011/0231091 A1 | 9/2011 | Gourlay et al. |
| 2011/0234369 A1 | 9/2011 | Cai et al. |
| 2011/0245999 A1 | 10/2011 | Kordonowy |
| 2011/0246210 A1 | 10/2011 | Matsur |
| 2011/0247013 A1 | 10/2011 | Feller et al. |
| 2011/0251734 A1 | 10/2011 | Schepp et al. |
| 2011/0257973 A1 | 10/2011 | Chutorash et al. |
| 2011/0267204 A1 | 11/2011 | Chuang et al. |
| 2011/0267205 A1 | 11/2011 | McClellan et al. |
| 2011/0286676 A1 | 11/2011 | El Dokor |
| 2011/0288891 A1* | 11/2011 | Zaid .................. G06Q 30/0611 705/26.4 |
| 2011/0291886 A1 | 12/2011 | Krieter |
| 2011/0291926 A1 | 12/2011 | Gokturk et al. |
| 2011/0298808 A1 | 12/2011 | Rovik |
| 2011/0301844 A1 | 12/2011 | Aono |
| 2011/0307354 A1 | 12/2011 | Erman et al. |
| 2011/0307570 A1 | 12/2011 | Speks |
| 2011/0309926 A1 | 12/2011 | Eikelenberg et al. |
| 2011/0309953 A1 | 12/2011 | Petite et al. |
| 2011/0313653 A1 | 12/2011 | Lindner |
| 2011/0320089 A1 | 12/2011 | Lewis |
| 2012/0006610 A1 | 1/2012 | Wallace et al. |
| 2012/0010807 A1 | 1/2012 | Zhou |
| 2012/0016581 A1 | 1/2012 | Mochizuki et al. |
| 2012/0029852 A1 | 2/2012 | Goff et al. |
| 2012/0030002 A1 | 2/2012 | Bous et al. |
| 2012/0030512 A1 | 2/2012 | Wadhwa et al. |
| 2012/0038489 A1 | 2/2012 | Goldshmidt |
| 2012/0046822 A1 | 2/2012 | Anderson |
| 2012/0047530 A1 | 2/2012 | Shkedi |
| 2012/0053793 A1 | 3/2012 | Sala et al. |
| 2012/0053888 A1 | 3/2012 | Stahlin et al. |
| 2012/0059789 A1 | 3/2012 | Sakai et al. |
| 2012/0065815 A1 | 3/2012 | Hess |
| 2012/0065834 A1 | 3/2012 | Senart |
| 2012/0068956 A1 | 3/2012 | Jira et al. |
| 2012/0071097 A1 | 3/2012 | Matsushita et al. |
| 2012/0072244 A1 | 3/2012 | Collins et al. |
| 2012/0074770 A1 | 3/2012 | Lee |
| 2012/0083960 A1 | 4/2012 | Zhu et al. |
| 2012/0083971 A1 | 4/2012 | Preston |
| 2012/0084773 A1 | 4/2012 | Lee et al. |
| 2012/0089299 A1 | 4/2012 | Breed |
| 2012/0092251 A1 | 4/2012 | Hashimoto et al. |
| 2012/0101876 A1 | 4/2012 | Truvey et al. |
| 2012/0101914 A1 | 4/2012 | Kumar et al. |
| 2012/0105613 A1 | 5/2012 | Weng et al. |
| 2012/0106114 A1 | 5/2012 | Caron et al. |
| 2012/0109446 A1 | 5/2012 | Yousefi et al. |
| 2012/0109451 A1 | 5/2012 | Tan |
| 2012/0110356 A1 | 5/2012 | Yousefi et al. |
| 2012/0113822 A1 | 5/2012 | Letner |
| 2012/0115446 A1 | 5/2012 | Guatama et al. |
| 2012/0116609 A1 | 5/2012 | Jung et al. |
| 2012/0116678 A1 | 5/2012 | Witmer |
| 2012/0116696 A1 | 5/2012 | Wank |
| 2012/0146766 A1 | 6/2012 | Geisler et al. |
| 2012/0146809 A1 | 6/2012 | Oh et al. |
| 2012/0149341 A1 | 6/2012 | Tadayon et al. |
| 2012/0150651 A1 | 6/2012 | Hoffberg et al. |
| 2012/0155636 A1 | 6/2012 | Muthaiah |
| 2012/0158436 A1 | 6/2012 | Bauer et al. |
| 2012/0173900 A1 | 7/2012 | Diab et al. |
| 2012/0173905 A1 | 7/2012 | Diab et al. |
| 2012/0179325 A1 | 7/2012 | Faenger |
| 2012/0179547 A1 | 7/2012 | Besore et al. |
| 2012/0188876 A1 | 7/2012 | Chow et al. |
| 2012/0197523 A1 | 8/2012 | Kirsch |
| 2012/0197669 A1 | 8/2012 | Kote et al. |
| 2012/0204166 A1 | 8/2012 | Ichihara |
| 2012/0210160 A1 | 8/2012 | Fuhrman |
| 2012/0215375 A1 | 8/2012 | Chang |
| 2012/0217928 A1 | 8/2012 | Kulidjian |
| 2012/0218125 A1 | 8/2012 | Demirdjian et al. |
| 2012/0226413 A1 | 9/2012 | Chen et al. |
| 2012/0238286 A1 | 9/2012 | Mallavarapu et al. |
| 2012/0239242 A1 | 9/2012 | Uehara |
| 2012/0242510 A1 | 9/2012 | Choi et al. |
| 2012/0254763 A1 | 10/2012 | Protopapas et al. |
| 2012/0254804 A1 | 10/2012 | Shema et al. |
| 2012/0259951 A1 | 10/2012 | Schalk et al. |
| 2012/0265359 A1 | 10/2012 | Das |
| 2012/0274459 A1 | 11/2012 | Jaisimha et al. |
| 2012/0274481 A1 | 11/2012 | Ginsberg et al. |
| 2012/0284292 A1 | 11/2012 | Rechsteiner et al. |

(56) References Cited

U.S. PATENT DOCUMENTS

| | | |
|---|---|---|
| 2012/0289217 A1 | 11/2012 | Reimer et al. |
| 2012/0289253 A1 | 11/2012 | Haag et al. |
| 2012/0296567 A1 | 11/2012 | Breed |
| 2012/0313771 A1 | 12/2012 | Wottlifff, III |
| 2012/0316720 A1 | 12/2012 | Hyde et al. |
| 2012/0317561 A1 | 12/2012 | Aslam et al. |
| 2012/0323413 A1 | 12/2012 | Kedar-Dongarkar et al. |
| 2012/0327231 A1 | 12/2012 | Cochran et al. |
| 2013/0005263 A1 | 1/2013 | Sakata |
| 2013/0005414 A1 | 1/2013 | Bindra et al. |
| 2013/0013157 A1 | 1/2013 | Kim et al. |
| 2013/0019252 A1 | 1/2013 | Haase et al. |
| 2013/0024060 A1 | 1/2013 | Sukkarie et al. |
| 2013/0030645 A1 | 1/2013 | Divine et al. |
| 2013/0030811 A1 | 1/2013 | Olleon et al. |
| 2013/0031540 A1 | 1/2013 | Throop et al. |
| 2013/0031541 A1 | 1/2013 | Wilks et al. |
| 2013/0035063 A1 | 2/2013 | Fisk et al. |
| 2013/0046624 A1 | 2/2013 | Calman |
| 2013/0050069 A1 | 2/2013 | Ota |
| 2013/0055096 A1 | 2/2013 | Kim et al. |
| 2013/0059607 A1 | 3/2013 | Herz et al. |
| 2013/0063336 A1 | 3/2013 | Sugimoto et al. |
| 2013/0066512 A1 | 3/2013 | Willard et al. |
| 2013/0067599 A1 | 3/2013 | Raje et al. |
| 2013/0075530 A1 | 3/2013 | Shander et al. |
| 2013/0079964 A1 | 3/2013 | Sukkarie et al. |
| 2013/0083805 A1 | 4/2013 | Lu et al. |
| 2013/0085787 A1 | 4/2013 | Gore et al. |
| 2013/0086164 A1 | 4/2013 | Wheeler et al. |
| 2013/0099915 A1 | 4/2013 | Prasad et al. |
| 2013/0103196 A1 | 4/2013 | Monceaux et al. |
| 2013/0116882 A1 | 5/2013 | Link et al. |
| 2013/0116915 A1 | 5/2013 | Ferreira et al. |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0139140 A1 | 5/2013 | Rao et al. |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0151288 A1 | 6/2013 | Bowne et al. |
| 2013/0152003 A1 | 6/2013 | Ricci et al. |
| 2013/0154298 A1 | 6/2013 | Ricci |
| 2013/0157640 A1 | 6/2013 | Aycock |
| 2013/0157647 A1 | 6/2013 | Kolodziej |
| 2013/0158778 A1 | 6/2013 | Tengler et al. |
| 2013/0158821 A1 | 6/2013 | Ricci |
| 2013/0166096 A1 | 6/2013 | Jotanovic |
| 2013/0166097 A1 | 6/2013 | Ricci |
| 2013/0166098 A1 | 6/2013 | Lavie et al. |
| 2013/0166152 A1 | 6/2013 | Butterworth |
| 2013/0166208 A1 | 6/2013 | Forstall et al. |
| 2013/0167159 A1 | 6/2013 | Ricci et al. |
| 2013/0173531 A1 | 7/2013 | Rinearson et al. |
| 2013/0179689 A1 | 7/2013 | Matsumoto et al. |
| 2013/0190978 A1 | 7/2013 | Kato et al. |
| 2013/0194108 A1 | 8/2013 | Lapiotis et al. |
| 2013/0197796 A1 | 8/2013 | Obradovich et al. |
| 2013/0198031 A1 | 8/2013 | Mitchell et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204455 A1 | 8/2013 | Chia et al. |
| 2013/0204457 A1 | 8/2013 | King |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0207794 A1 | 8/2013 | Patel et al. |
| 2013/0212065 A1 | 8/2013 | Rahnama |
| 2013/0212659 A1 | 8/2013 | Maher et al. |
| 2013/0215116 A1 | 8/2013 | Siddique et al. |
| 2013/0218412 A1 | 8/2013 | Ricci |
| 2013/0218445 A1 | 8/2013 | Basir |
| 2013/0219039 A1 | 8/2013 | Ricci |
| 2013/0226365 A1 | 8/2013 | Brozovich |
| 2013/0226371 A1 | 8/2013 | Rovik et al. |
| 2013/0226392 A1 | 8/2013 | Schneider et al. |
| 2013/0226449 A1 | 8/2013 | Rovik et al. |
| 2013/0226622 A1 | 8/2013 | Adamson et al. |
| 2013/0227648 A1 | 8/2013 | Ricci |
| 2013/0231784 A1 | 9/2013 | Rovik et al. |
| 2013/0231800 A1 | 9/2013 | Ricci |
| 2013/0232142 A1 | 9/2013 | Nielsen et al. |
| 2013/0238165 A1 | 9/2013 | Garrett et al. |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0261871 A1 | 10/2013 | Hobbs et al. |
| 2013/0261966 A1 | 10/2013 | Wang et al. |
| 2013/0265178 A1 | 10/2013 | Tengler et al. |
| 2013/0274997 A1 | 10/2013 | Chien |
| 2013/0279111 A1 | 10/2013 | Lee |
| 2013/0279491 A1 | 10/2013 | Rubin et al. |
| 2013/0282238 A1 | 10/2013 | Ricci et al. |
| 2013/0282357 A1 | 10/2013 | Rubin et al. |
| 2013/0282946 A1 | 10/2013 | Ricci |
| 2013/0288606 A1 | 10/2013 | Kirsch |
| 2013/0293364 A1 | 11/2013 | Ricci et al. |
| 2013/0293452 A1 | 11/2013 | Ricci et al. |
| 2013/0293480 A1 | 11/2013 | Kritt et al. |
| 2013/0295901 A1 | 11/2013 | Abramson et al. |
| 2013/0295908 A1 | 11/2013 | Zeinstra et al. |
| 2013/0295913 A1 | 11/2013 | Matthews et al. |
| 2013/0300554 A1 | 11/2013 | Braden |
| 2013/0301584 A1 | 11/2013 | Addepalli et al. |
| 2013/0304371 A1 | 11/2013 | Kitatani et al. |
| 2013/0308265 A1 | 11/2013 | Arnouse |
| 2013/0309977 A1 | 11/2013 | Heines et al. |
| 2013/0311038 A1 | 11/2013 | Kim et al. |
| 2013/0325453 A1 | 12/2013 | Levien et al. |
| 2013/0325568 A1 | 12/2013 | Mangalvedkar et al. |
| 2013/0329372 A1 | 12/2013 | Wilkins |
| 2013/0332023 A1 | 12/2013 | Bertosa et al. |
| 2013/0338914 A1 | 12/2013 | Weiss |
| 2013/0339027 A1 | 12/2013 | Dokor et al. |
| 2013/0345929 A1 | 12/2013 | Bowden et al. |
| 2014/0028542 A1 | 1/2014 | Lovitt et al. |
| 2014/0032014 A1 | 1/2014 | DeBiasio et al. |
| 2014/0054957 A1 | 2/2014 | Bellis |
| 2014/0058672 A1 | 2/2014 | Wansley et al. |
| 2014/0066014 A1 | 3/2014 | Nicholson et al. |
| 2014/0067201 A1 | 3/2014 | Visintainer et al. |
| 2014/0067564 A1 | 3/2014 | Yuan |
| 2014/0070917 A1 | 3/2014 | Protopapas |
| 2014/0081544 A1 | 3/2014 | Fry |

(56) References Cited

U.S. PATENT DOCUMENTS

| | | |
|---|---|---|
| 2014/0088798 A1 | 3/2014 | Himmelstein |
| 2014/0096068 A1 | 4/2014 | Dewan et al. |
| 2014/0097955 A1 | 4/2014 | Lovitt et al. |
| 2014/0109075 A1 | 4/2014 | Hoffman et al. |
| 2014/0109080 A1 | 4/2014 | Ricci |
| 2014/0120829 A1 | 5/2014 | Bhamidipati et al. |
| 2014/0121862 A1 | 5/2014 | Zarrella et al. |
| 2014/0125802 A1 | 5/2014 | Beckert et al. |
| 2014/0143839 A1 | 5/2014 | Ricci |
| 2014/0164611 A1 | 6/2014 | Molettiere et al. |
| 2014/0168062 A1 | 6/2014 | Katz et al. |
| 2014/0168436 A1 | 6/2014 | Pedicino |
| 2014/0169621 A1 | 6/2014 | Burr |
| 2014/0171752 A1 | 6/2014 | Park et al. |
| 2014/0172727 A1* | 6/2014 | Abhyanker ........ G06Q 30/0645 705/307 |
| 2014/0188533 A1 | 7/2014 | Davidson |
| 2014/0195272 A1 | 7/2014 | Sadiq et al. |
| 2014/0198216 A1 | 7/2014 | Zhai et al. |
| 2014/0200737 A1 | 7/2014 | Lortz et al. |
| 2014/0207328 A1 | 7/2014 | Wolf et al. |
| 2014/0220966 A1 | 8/2014 | Muetzel et al. |
| 2014/0222298 A1 | 8/2014 | Gurin |
| 2014/0223384 A1 | 8/2014 | Graumann |
| 2014/0240089 A1 | 8/2014 | Chang |
| 2014/0244078 A1 | 8/2014 | Downey et al. |
| 2014/0244111 A1 | 8/2014 | Gross et al. |
| 2014/0244156 A1 | 8/2014 | Magnusson et al. |
| 2014/0245277 A1 | 8/2014 | Petro et al. |
| 2014/0245278 A1 | 8/2014 | Zellen |
| 2014/0245284 A1 | 8/2014 | Alrabady et al. |
| 2014/0252091 A1 | 9/2014 | Morse et al. |
| 2014/0257627 A1 | 9/2014 | Hagan, Jr. |
| 2014/0267035 A1 | 9/2014 | Schalk et al. |
| 2014/0277936 A1 | 9/2014 | El Dokor et al. |
| 2014/0278070 A1 | 9/2014 | McGavran et al. |
| 2014/0278071 A1 | 9/2014 | San Filippo et al. |
| 2014/0281971 A1 | 9/2014 | Isbell, III et al. |
| 2014/0282161 A1 | 9/2014 | Cash |
| 2014/0282278 A1 | 9/2014 | Anderson et al. |
| 2014/0282470 A1 | 9/2014 | Buga et al. |
| 2014/0282931 A1 | 9/2014 | Protopapas |
| 2014/0292545 A1 | 10/2014 | Nemoto |
| 2014/0292665 A1 | 10/2014 | Lathrop et al. |
| 2014/0303899 A1 | 10/2014 | Fung |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307655 A1 | 10/2014 | Ricci |
| 2014/0307724 A1 | 10/2014 | Ricci |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0322676 A1 | 10/2014 | Raman |
| 2014/0347207 A1 | 11/2014 | Zeng et al. |
| 2014/0347265 A1 | 11/2014 | Allen et al. |
| 2015/0007155 A1 | 1/2015 | Hoffman et al. |
| 2015/0012186 A1 | 1/2015 | Horseman |
| 2015/0032366 A1 | 1/2015 | Man et al. |
| 2015/0032670 A1 | 1/2015 | Brazell |
| 2015/0057839 A1 | 2/2015 | Chang et al. |
| 2015/0061895 A1 | 3/2015 | Ricci |
| 2015/0081133 A1 | 3/2015 | Schulz |
| 2015/0081167 A1 | 3/2015 | Pisz et al. |
| 2015/0088423 A1 | 3/2015 | Tuukkanen |
| 2015/0088515 A1 | 3/2015 | Beaumont et al. |
| 2015/0116200 A1 | 4/2015 | Kurosawa et al. |
| 2015/0158499 A1 | 6/2015 | Koravadi |
| 2015/0178034 A1 | 6/2015 | Penilla et al. |
| 2016/0008985 A1 | 1/2016 | Kim et al. |
| 2016/0070527 A1 | 3/2016 | Ricci |
| 2016/0086391 A1 | 3/2016 | Ricci |
| 2016/0269456 A1 | 9/2016 | Ricci |
| 2016/0269469 A1 | 9/2016 | Ricci |
| 2017/0140452 A1 | 5/2017 | Li et al. |

FOREIGN PATENT DOCUMENTS

| | | |
|---|---|---|
| CN | 101303878 | 11/2008 |
| CN | 102467827 | 5/2012 |
| EP | 1223567 | 7/2002 |
| EP | 1484729 | 12/2004 |
| EP | 2192015 | 6/2010 |
| JP | 2004-284450 | 10/2004 |
| KR | 2006-0128484 | 12/2006 |
| WO | WO 2007/126204 | 11/2007 |
| WO | WO 2012/102879 | 8/2012 |
| WO | WO 2013/074866 | 5/2013 |
| WO | WO 2013/074867 | 5/2013 |
| WO | WO 2013/074868 | 5/2013 |
| WO | WO 2013/074897 | 5/2013 |

(56) References Cited

FOREIGN PATENT DOCUMENTS

| | | |
|---|---|---|
| WO | WO 2013/074899 | 5/2013 |
| WO | WO 2013/074901 | 5/2013 |
| WO | WO 2013/074919 | 5/2013 |
| WO | WO 2013/074981 | 5/2013 |
| WO | WO 2013/074983 | 5/2013 |
| WO | WO 2013/075005 | 5/2013 |
| WO | WO 2013/181310 | 12/2013 |
| WO | WO 2014/014862 | 1/2014 |
| WO | WO 2014/143563 | 9/2014 |
| WO | WO 2014/158667 | 10/2014 |
| WO | WO 2014/158672 | 10/2014 |
| WO | WO 2014/158766 | 10/2014 |
| WO | WO 2014/172312 | 10/2014 |
| WO | WO 2014/172313 | 10/2014 |
| WO | WO 2014/172316 | 10/2014 |
| WO | WO 2014/172320 | 10/2014 |
| WO | WO 2014/172322 | 10/2014 |
| WO | WO 2014/172323 | 10/2014 |
| WO | WO 2014/172327 | 10/2014 |
| WO | WO 2016/145073 | 9/2016 |
| WO | WO 2016/145100 | 9/2016 |

OTHER PUBLICATIONS

U.S. Appl. No. 61/567,962, filed Dec. 7, 2011, Baarman et al.
"Nexus 10 Guidebook for Android," Google Inc., © 2012, Edition 1.2, 166 pages.
"Self-Driving: Self-Driving Autonomous Cars," available at http://www.automotivetechnologies.com/autonomous-self-driving-cars, accessed Dec. 2016, 9 pages.
"We Come to You," Downtown Nashville Nissan, 2014, available at www.downtownnashvillenissan.com/assets/misc/5827/paralax/we-come-to-you.html, 5 pages.
Amor-Segan et al., "Towards the Self Healing Vehicle," Automotive Electronics, Jun. 2007, 2007 3rd Institution of Engineering and Technology Conference, 7 pages.
Bennett, "Meet Samsung's Version of Apple AirPlay," CNET.com, Oct. 10, 2012, 11 pages.
Cairnie et al., "Using Finger-Pointing to Operate Secondary Controls in Automobiles," Proceedings of the IEEE Intelligent Vehicles Symposium 2000, Oct. 3-5, 2000, 6 pages.
Clark, "How Self-Driving Cars Work: The Nuts and Bolts Behind Google's Autonomous Car Program," Feb. 21, 2015, available at http://www.makeuseof.com/tag/how-self-driving-cars-work-the-nuts-and-bolts-behind-googles-autonomous-car-program/, 9 pages.
Deaton et al., "How Driverless Cars Will Work," Jul. 1, 2008, HowStuffWorks.com. <http://auto.howstuffworks.com/under-the-hood/trends-innovations/driverless-car.htm> Sep. 18, 2017, 10 pages.
Dumbaugh, "Safe Streets, Livable Streets: A Positive Approach to urban Roadside Design," Ph.D. dissertation for School of Civil & Environ. Engr., Georgia Inst. Of Technology, Dec. 2005, 235 pages.
Fei et al., "A QoS-aware Dynamic Bandwidth Allocation Algorithm for Relay Stations in IEEE 802.16j-based Vehicular Networks," Proceedings of the 2010 IEEE Global Telecommunications Conference, Dec. 10, 2010, 10 pages.
Ge et al., "Optimal Relay Selection in IEEE 802.16j Multihop Relay Vehicular Networks," IEEE Transactions on Vehicular Technology, 2010, vol. 59(5), pp. 2198-2206.
Guizzo, Erico, "How Google's Self-Driving Car Works," Oct. 18, 2011, available at https://spectrum.ieee.org/automaton/robotics/artificial-intelligence/how-google-self-driving-car-works, 5 pages.
Heer et al., "ALPHA: An Adaptive and Lightweight Protocol for Hop-by-hop Authentication," Proceedings of CoNEXT 2008, Dec. 2008, pp. 1-12.
Jahnich et al., "Towards a Middleware Approach for a Self-Configurable Automotive Embedded System," International Federation for Information Processing, 2008, pp. 55-65.
Persson "Adaptive Middleware for Self-Configurable Embedded Real-Time Systems," KTH Industrial Engineering and Management, 2009, pages iii-71 and references.
Raychaudhuri et al., "Emerging Wireless Technologies and the Future Mobile Internet," p. 48, Cambridge Press, 2011, 3 pages.
Stephens, Leah, "How Driverless Cars Work," Interesting Engineering, Apr. 28, 2016, available at https://interestingengineering.com/driverless-cars-work/, 7 pages.
Stoller, "Leader Election in Distributed Systems with Crash Failures," Indiana University, 1997, pp. 1-15.
Strunk et al., "The Elements of Style," 3d ed., Macmillan Publishing Co., 1979, 3 pages.
Suwatthikul, "Fault detection and diagnosis for in-vehicle networks," Intech, 2010, pp. 283-286.
Walter et al., "The smart car seat: personalized monitoring of vital signs in automotive applications." Personal and Ubiquitous Computing, Oct. 2011, vol. 15, No. 7, pp. 707-715.
Wolf et al., "Design, Implementation, and Evaluation of a Vehicular Hardware Security Module," ICISC'11 Proceedings of the 14th Int'l Conf. Information Security & Cryptology, Springer-Verlag Berlin, Heidelberg, 2011, pp. 302-318.
Official Action for U.S. Appl. No. 15/202,013, dated Sep. 20, 2018, 7 pages, Restriction Requirement.
Official Action for U.S. Appl. No. 15/202,013, dated Sep. 20, 2018, 22 pages.
Official Action for U.S. Appl. No. 15/202,013, dated Mar. 27, 2019, 22 pages.
Official Action for U.S. Appl. No. 15/202,013, dated Feb. 4, 2020, 17 pages.
Notice of Allowance for U.S. Appl. No. 15/202,013, dated Feb. 4, 2020, 17 pages.

* cited by examiner

Fig. 6 — Selling Process - Car Dealer Prospective

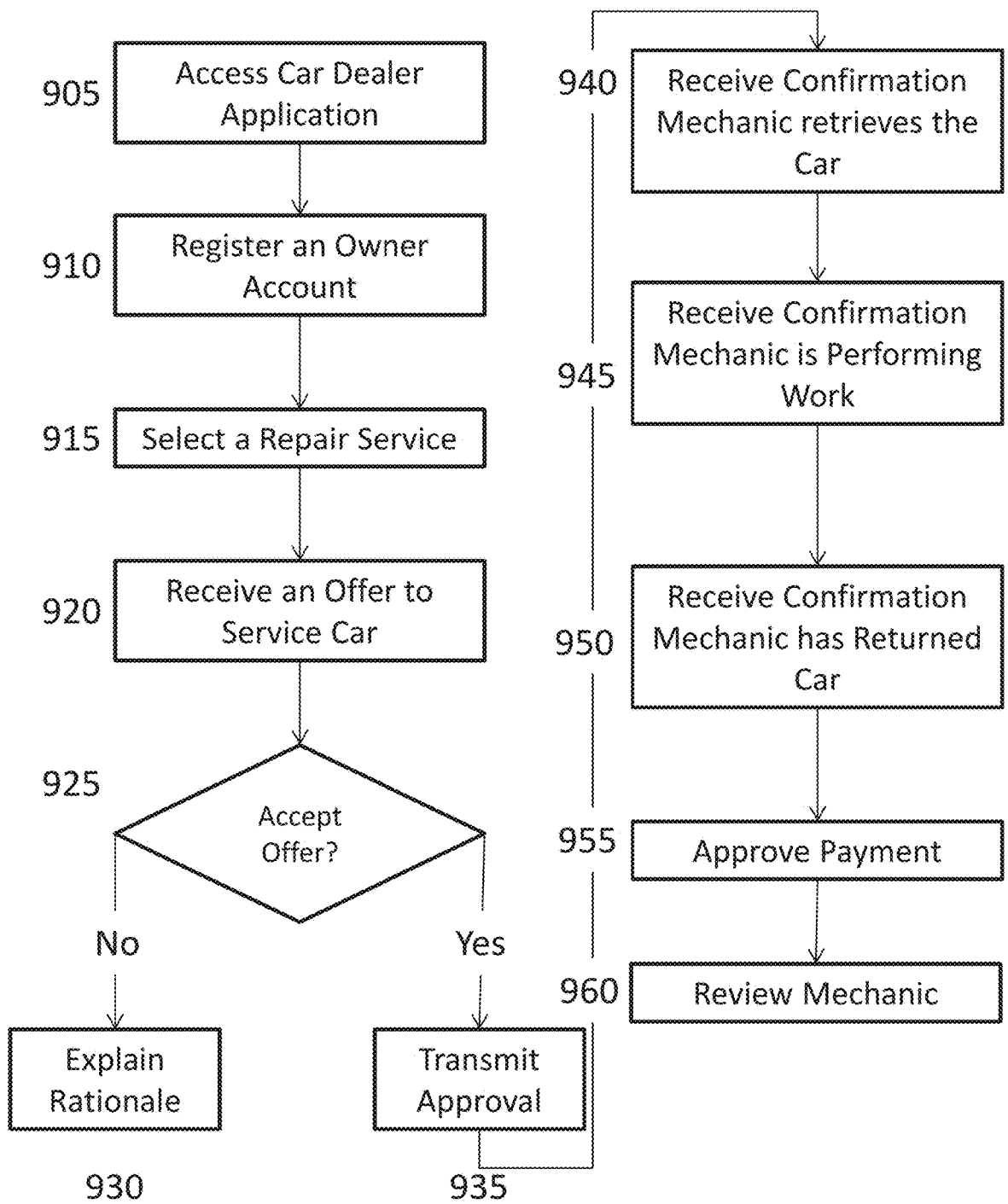

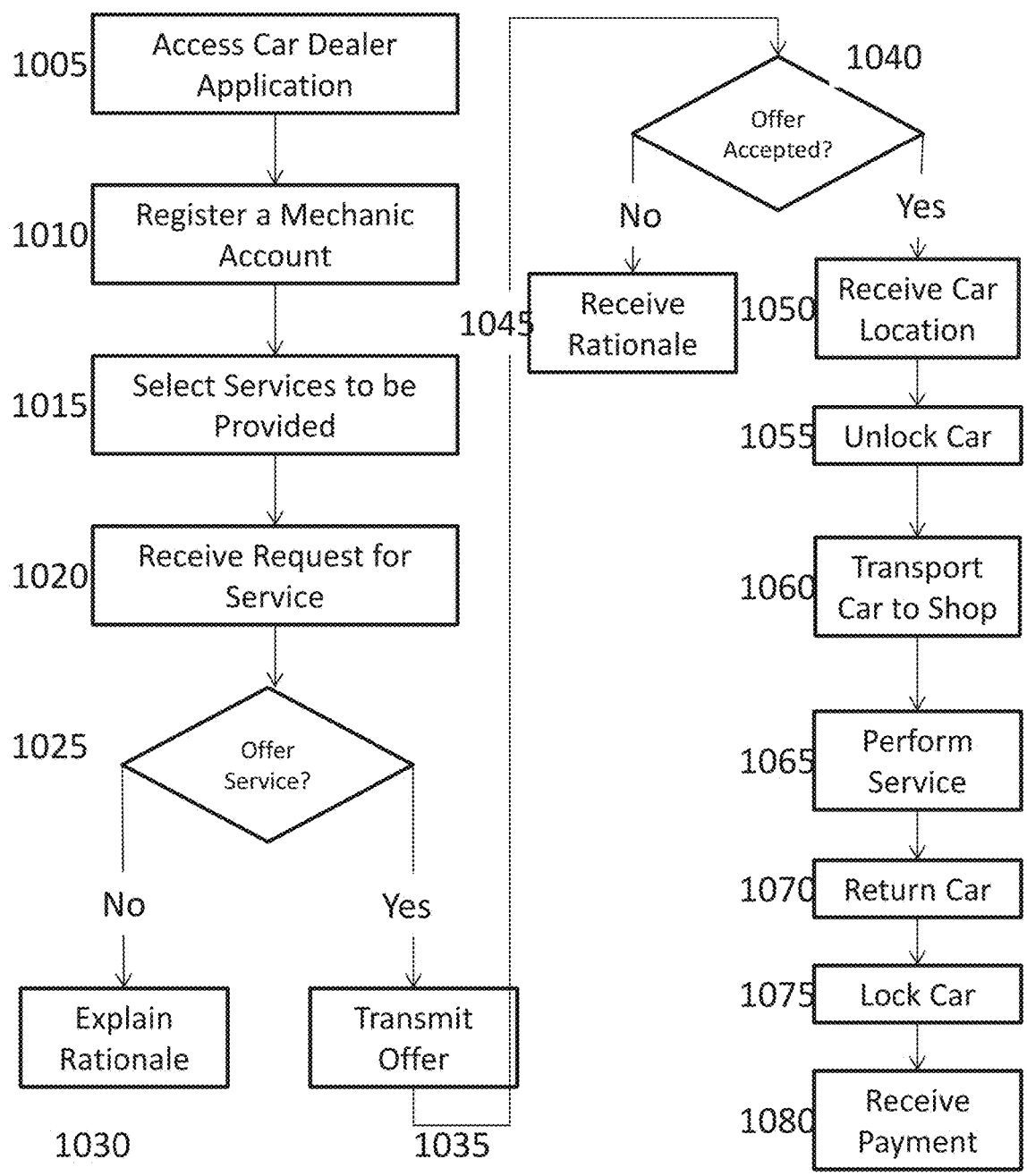

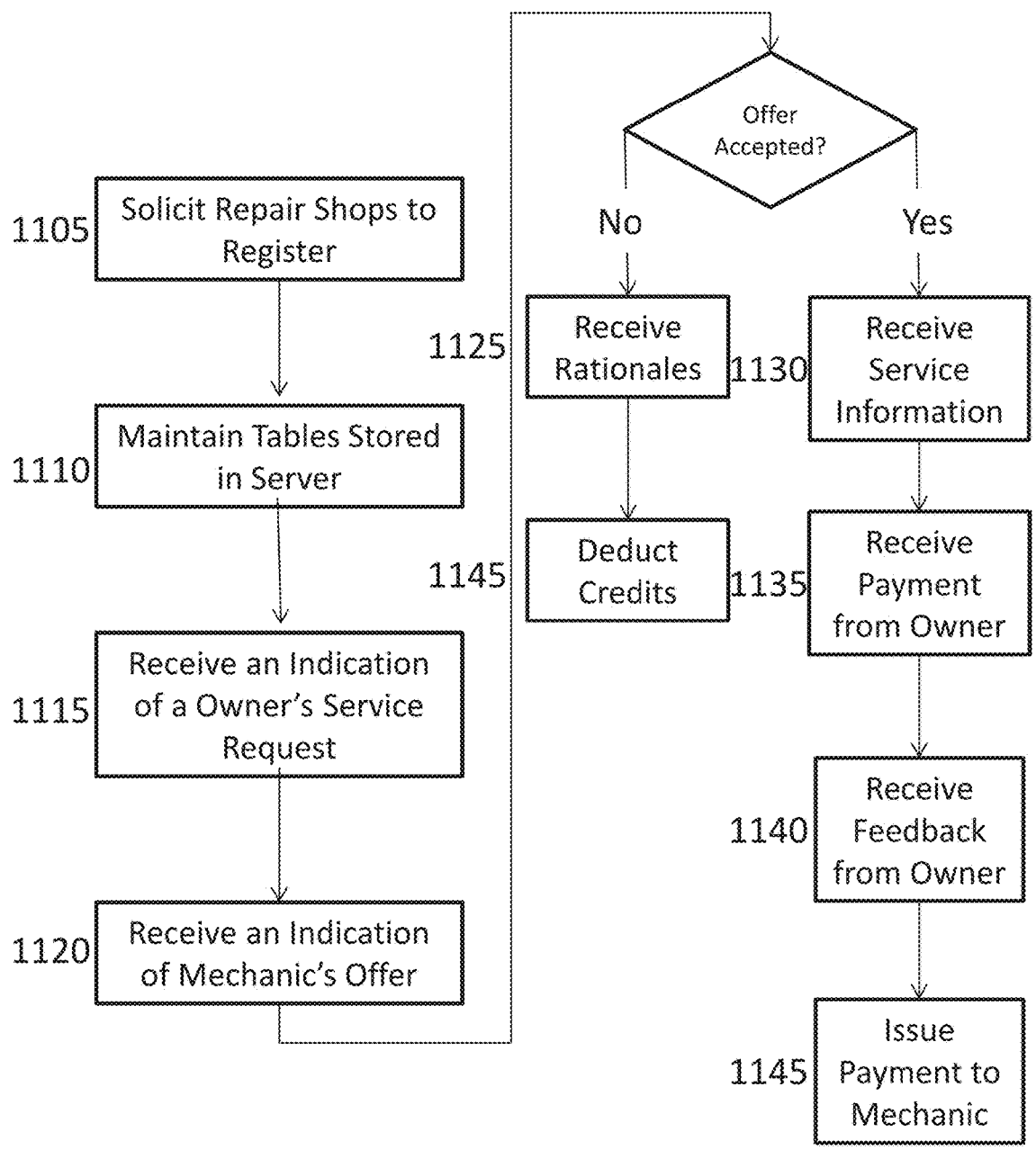
Fig. 11  Car Service Process- Car Dealer Prospective

NETWORK-BASED SYSTEM FOR SHOWING CARS FOR SALE BY NON-DEALER VEHICLE OWNERS

CROSS REFERENCE TO RELATED APPLICATIONS

This application is a continuation of and claims priority to U.S. patent application Ser. No. 15/202,013, filed Jul. 5, 2016, of the same title, which claims the benefit of U.S. Provisional Application No. 62/256,533, filed Nov. 17, 2015, each of which is incorporated by reference as if fully set forth.

FIELD OF THE INVENTION

The present invention is generally directed to a method and apparatus for selling and servicing new and used cars.

BACKGROUND

Car dealerships have existed since the time of Henry Ford and little has changed since then. The dealership typically spans several acres and has a large inventory of cars for the potential buyer to look at and test drive. Many consumers do not like going to car dealerships. They find the locations of the dealership inconvenient, the salesmen pushy and the options overwhelming. As a result, consumers are less apt to picture themselves in the car and ultimately purchase the car.

Technology recently has infiltrated the car dealership space, and some dealerships now allow potential buyers to browse cars online and even schedule a test drive. In the case of a scheduled test drive, a salesman from the dealership brings the car to the potential buyer for an evaluation. This results in additional labor, wear and tear on a new car and still requires a large inventory of new cars.

In addition, Car Dealerships also provide maintenance and repair services to customers who have purchased cars. This requires the Car Dealership to maintain a fully staffed service department and invest considerable money and resources in the tools and equipment needed to perform the maintenance and repair services. Most Dealerships will only service the brand of cars they sell. This often results in Car Dealerships' service departments not being fully utilized. As a result, Car Dealerships are forced to charge more for basic maintenance and repair services than independent repair shops who can fully utilize their resources by servicing many brands of cars. Consequently, many Consumers do not like having their cars serviced at the Car Dealership because they find the locations inconvenient and do not like paying more for the same services they can receive at an independent repair shop. However, Consumers are often concerned with the reputation and the ability of the independent shop to properly service their car. As a result, a consumer must decide between the convenience and lower price of a local repair shop and the peace of mind and higher price of the Dealer-provided service.

Until the current invention, however, it has been impossible to successfully leverage owners who have recently purchased and are happy with a new car. In addition, until the current invention, it has been impossible for Car Dealerships to leverage the independent car repair shops to provide convenient service to the Consumers who have already purchased their vehicles.

BRIEF DESCRIPTION OF THE DRAWINGS

A more detailed understanding may be had from the following description, given by way of example in conjunction with the accompanying drawings wherein:

FIG. 9 is a block diagram of an example of the car service process from the prospective of a Car Mechanic.

FIG. 10 is a block diagram of an example of the car service process from the prospective of the Car Seller.

FIG. 11 is a block diagram of an example of the car service process from the perspective of a Car Dealer.

DETAILED DESCRIPTION OF THE EMBODIMENTS

Below are described methods and apparatus to sell and service new and used cars. These methods overcome the disadvantages currently found in the prior art which require a Car Dealer to maintain a large inventory of cars, large showrooms and expensive salesmen to make new car sales. Further, the methods also enable a Car Dealer to provide continued maintenance and repair services to Consumers who have previously purchased cars from the Car Dealer without requiring the large expensive service departments found in the prior art.

Instead, the methods leverage a network of existing car owners and cars that have already been sold. Further, it enables consumers to explore the car on his/her own without having to interact with a salesperson. In addition, the methods allow a Car Owner who has already purchased the car from the Car Dealer to receive service without having to travel to the car dealership and pay a premium price. The disclosure below is also applicable to hardware such as servers, cars, computers and mobile phones that embody aspects of the invention.

The current invention leverages a network of customers who have already purchased a particular type of vehicle to assist in selling vehicles of the same type to potential customers in their geographic area. Further, it leverages existing independent repair facilities that already have staff and equipment to perform the repair service and maintenance on vehicles that have already been sold.

Figure 1:
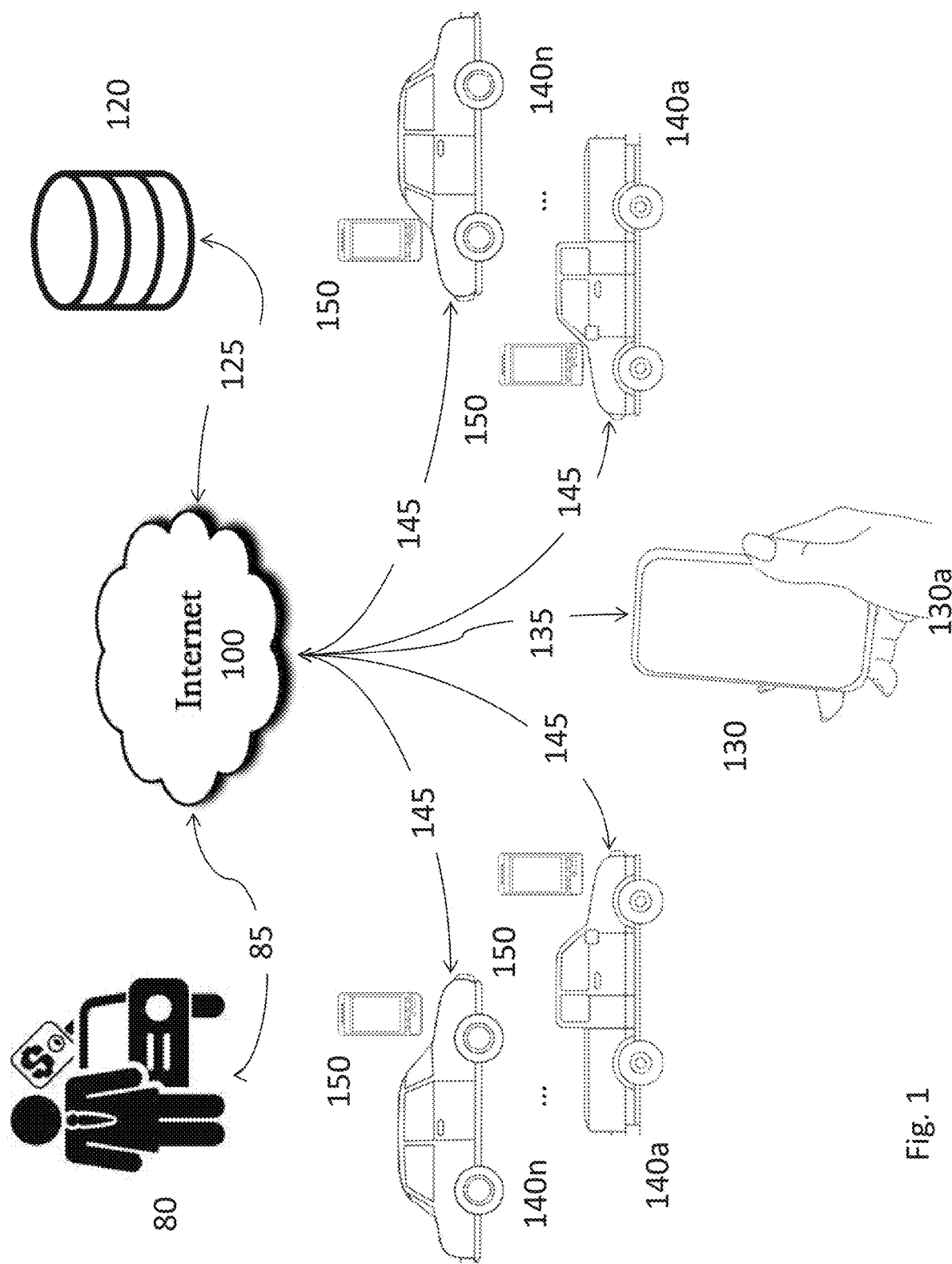
FIG. 1 is a diagram of an exemplary system practicing the method of selling cars.

FIG. 1 depicts a diagram of an exemplary system practicing the method of selling cars. In this system, a plurality of cars and trucks 140a . . . 140n each contain a Car Computer 150. The Car Computers 150 are connected to the Internet 100 via a Wireless Communication Channel 145. The Car Dealer 110 is also connected to the Internet 100 via Communication Channel 115. A Server 120 is also connected to the Internet 100 via Communication Channel 125. A Potential Buyer 130a has a Mobile Computer 130 that is connected to the Internet 100 via a Wireless Communication Channel 135. The Communication Channels 135 and 145 may be of the form of any wireless communication mechanism such as LTE, 3G, WiMax etc.

The Car Computer 150 may be integral to the car or may be portable. If the Car Computer 150 is portable, it may be connected to an On Board Diagnostic Port (OBD II) or similar communication port.

The Car Computer 150 is capable of exchanging information with the Server 150. Information is reported to the Server 120 by the Car Computer 150. Car Computer 150 may include the position of the car in which the Car Computer is installed. The Car Computer 150 may determine the position of the Car by GPS or any similar technology. In addition, the Car Computer 150 may report to the Server 120 the number of miles driven, gas/electrical charge remaining, maintenance required, or any other information about the car.

The Car Computer 150 is also capable of unlocking the doors of the car, starting the car, and disabling the car. Unlocking, starting, and disabling may be performed in response to a command from the Server 120. The Car Computer 150 may also contain an integral camera or be connected to an external camera. The Car Computer may use the camera to capture an image or video of the driver. This image or video of the driver may be sent to the Server. In addition, the Car Computer 150 may have an internal near field communication device or be connected to an external near field communication device. This nearfield communication device may be capable of communicating through NFC, Bluetooth, RFID or any similar technology. The Car Computer 150 may use the near field communication device to verify the identity of a potential buyer 130a. In addition, the Car Computer 150 also includes a transmitter and a receiver to communicate over Wireless Communication Channel 145.

Each of the plurality of Cars 140a . . . 140n may be cars, trucks, motorcycles, or any other type of vehicles. These cars may have been sold by the Dealer 110, may have been manufactured by a manufacturer whom the Dealer 110 represents, or they may be cars which have been registered with the dealer. The Car Dealer 110 may allow Owners of old cars, who wish to trade the old cars in for new cars, to continue to use their old cars while registering the cars with the Car Dealer 110. The Car Dealer 110 may then attempt to sell the old car once it is registered.

The Mobile Computer 130 may be of any form known in the art, such as a laptop computer or smart phone. The Mobile Computer 130 is capable of running one or more applications. In addition, the Mobile Computer 130 is capable of determining the current position of the Mobile Computer 130 based upon GPS or similar technologies. The Mobile Computer 130 may also include a near field communication device that is capable of communicating with the near field communication device of the Car Computer 150. Further, the Mobile Computer is capable of retrieving information from the Server 120 and displays the information to the Buyer 130a. The Mobile Computer also allows information to be entered by the Buyer 130a and transmitted to the Server 120. The mobile computer also includes a transmitter and a receiver that communicate over the wireless channel 135.

Figure 2:
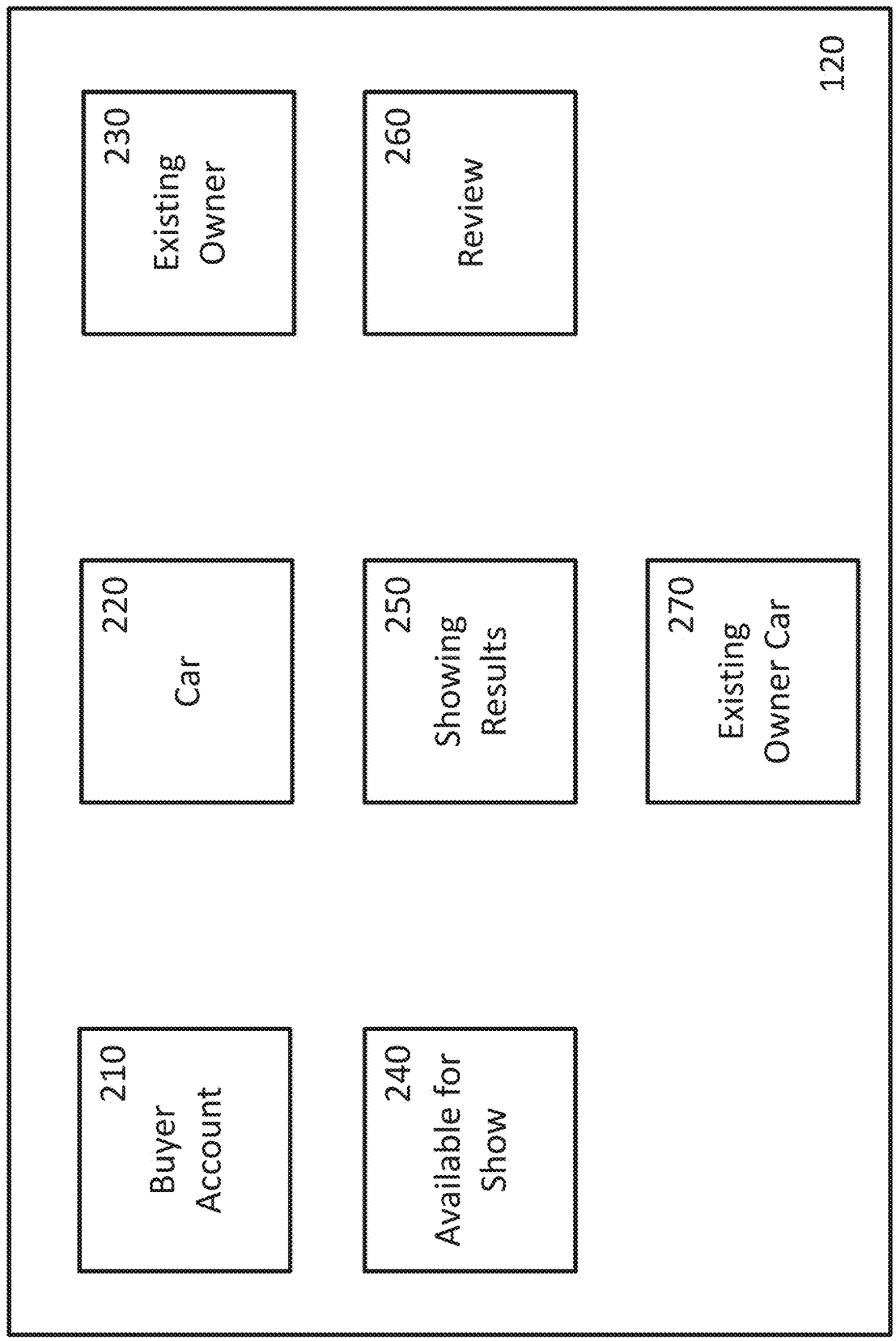
FIG. 2 is a graphic depiction of the tables that may be stored in a server.

The Server 120 may be of any form known in the art. The Server includes an application that is capable of transmitting and receiving information with the Mobile Computer 130, the Car Computer 150, and the Car Dealer 110 via the Internet 100. The Application is also capable of retrieving and storing information in one or more tables. The Server is capable of storing one or more data tables. FIG. 2 is a graphical depiction of example tables that may be stored in the Server 120. Those tables may include a Buyer Account Table 210, Car Table 220, Existing Owner Table 230, Available For Show Table 240, Showing Results Table 250, Review Table 260, and Existing Owner Account Table 270.

The Buyer Account Table 210 may include biographic information about the Buyer 130a, such as Name, Address, and Phone Number, etc. The Buyer Account Table may also include credit card information for the Buyer. In addition, the Buyer Account Table may include historical information about what cars the Buyer 103a has previously viewed. Further, the Buyer Account Table 210 may include driver's license information and insurance information for the Buyer 130a. The Buyer Account Table 210 may also include a photograph of the Buyer 130a. If the Car Computer 150 includes a camera, facial recognition software may be used to verify the identity of the Buyer 130a based upon the photograph stored in the Buyer Account Table 210. The Buyer Account Table 210 also includes information about the current geographic position of the Mobile Computer 130.

The Car Table 220 includes information about Make, Model, Year, and options for the cars sold by the Car Dealer 110. The information stored in the Car Table 220 is retrieved by the Buyer 130a and displayed on the Mobile Computer 130 when the Buyer is attempting to locate a car to buy.

The Existing Owner Table 230 includes biographic information for individuals who have already purchased a car. The Biographic information may include Name, Address, and Phone Number, etc. In addition, the Existing Owner Table 230 includes a credit balance for the Existing Owner. Credits are awarded/deducted to the Existing Owner by the Car Dealer 110. Credits may be awarded/deducted, for example, by:

Number of hours a car is "available for show";
Number of actual showings;
Number of test drives;
Reimbursement for Gas Consumed during test drives;
Number of Potential Buyers who ultimately buy the car; and
Potential Buyers Feedback.

Credits may also be deducted for:
Not reaching a threshold for the number of hours a car is available for show;
Not Accepting a viewing request;
Negative Buyer Feedback;
Failure to respond to a request in the predetermined period of time; and
Negative Car Condition.

A dealer may also create additional conditions for which an Existing owner is awarded credits and additional conditions for deducting credits. The credits may be converted into gift cards, cash, discounts on future car services, or any other form of consideration. The Existing Owner Table 230 may include an indication of how the Existing Owner would like to receive their credits.

The Available for Show Table 240 includes information about cars that an Existing Owner has designated as "Available for Show." This information may include the Make, Model, Year, and Options of the car. In addition, the information stored in the Available for Show Table 240 may include the current position of the car and the number of hours it is available for viewing.

The Showing Results Table 250 includes information about what happened when the potential buyer viewed the car. This information can include the date, duration of the viewing, if a test drive took place, and if the Buyer 130a actually purchased the vehicle. In addition, if the Car Computer 150 includes a camera, a picture or video of the Buyer may also be included.

The Review Table 260 includes reviews left by the Buyer 130a about the car. This information may include information about the condition of a particular car in addition to review information about the make, model, year, and options of the car. Information about the condition of the car may be used in the determination of what Credits to award/deduct to the Existing Owner.

The Existing Owner Car Table 270 includes information about a particular car which has been registered in the system and may be made "available for show." This information may include the Vehicle Identification Number (VIN), a photograph, the current mileage, service history, if maintenance is due, and the current amount of gas/charge in the car. In addition, the scale of the map is adjusted so that a minimum predetermined number of cars matching the criteria is shown. For instance, a very rare car type may require a 100 mile scale to reach the predetermined number of cars, whereas a very common car type might only require a 10 mile scale.

Figure 3:
FIG. 3 is a block diagram of an example of the process of selling cars from the prospective of a Potential Buyer.

FIG. 3 shows an example of a Map 300 that may be displayed on the Mobile Computer 130. The Map 300 may be generated by the Application on the Server 120 or may be generated by an Application on the Mobile Computer 130. The information displayed on the Map 300 is based upon the current position information is stored in the Available for Show Table 240 and the current geographic position of the Mobile Computer 130 stored in the Buyer Account Table 210. For example, 340a, 340b and 340c are cars that have been designated as Available For Show. The geographic location of the Car 340a, 340b and 340c shown to the Buyer 130a is depicted to the Buyer in obfuscated circles 360a, 360b and 360c, respectively. By obfuscating the exact location of the car, the privacy and security of the owner is protected. The exact location of the Car is not revealed to the Buyer until the Existing Owner Allows the Showing Request 525.

Figure 4:
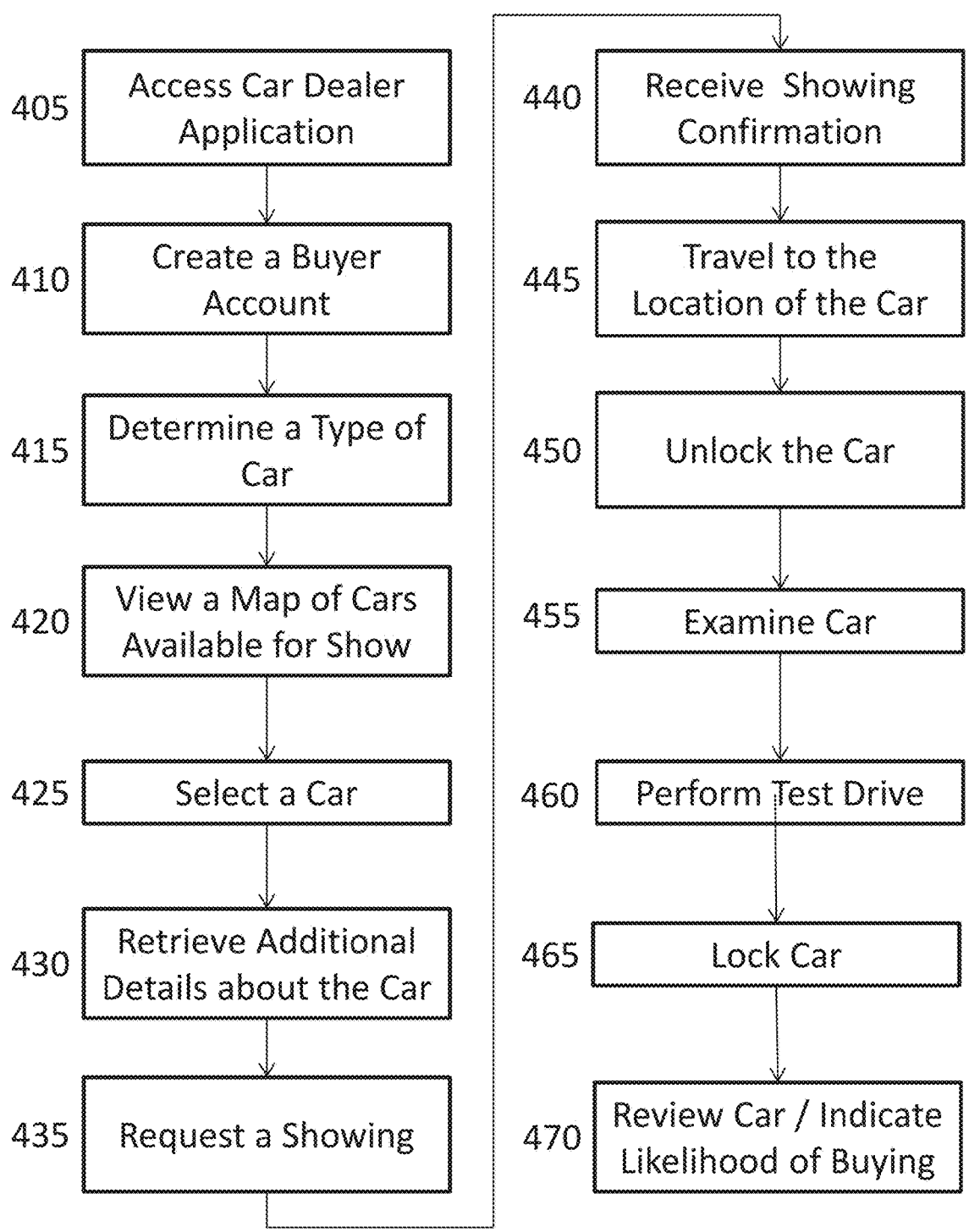
FIG. 4 is a block diagram of an example of the process of selling cars from the prospective of an Existing Owner.

FIG. 4 shows the process for the Car Dealer 110 to sell the car to the Buyer 130a from the perspective of the Buyer 130a.

In step 405, the Buyer 130a Accesses the Car Dealer Sales Application. The Car Dealer Sales Application may be in the form of a website, web application, or an application that is downloaded and installed on the Mobile Computer 130.

The Buyer 130a then creates a Buyer Account 410 by their biographic information. The Buyer 130a may also be required to provide a picture of themselves, their driver's license information, and insurance information. Additionally, they may be required to enter their credit card information. The information entered in step 410 is transmitted to the Server 120 where it is stored in the Buyer Account Information Table 210. This step may be skipped if the Buyer has already created a Buyer Account.

The Buyer then selects a type of Car 415 from a listing of available cars that are currently being sold by the Car Dealer 110. The listing of available cars is based upon information stored in the Car Table 220.

A map such, as FIG. 3, is then displayed 420 to the Buyer 130a. This map only includes cars that are indicated as available for show and match the type of car selected in step 415. Only the obfuscated location of the cars is displayed to the Buyer 130a.

The Buyer 130a then selects 425 a particular car from the map such as 340b.

Additional information regarding the particular car is retrieved 330 from the Server 120 and displayed to the Buyer 130a. The information retrieved is based upon the information stored in the Existing Owner Car Table 270.

Next, the Buyer 130a requests a showing of a particular car 335.

A message (email, SMS, in app alert, or the like) is sent to the Existing Owner indicating a request to see their car. This message is received by the Existing Owner 520. If the Existing Owner allows the request 525, the approval is transmitted 535 back to the Buyer 130a.

The Transmitted Approval is received by the Buyer in step 440. The Transmitted Approval also includes the exact geographic position of the car.

The Buyer 130a then travels to the geographic location of the car 445. Once at the car, a message is sent and received by the Existing Owner 540.

Once at the car, the Buyer 130a can unlock the car 350. To unlock the car, the Buyer 130a uses the Mobile Computer 130 in conjunction with the Car Computer 150 to verify their identity. The Buyer's identity may be verified by photographic recognition based on a camera connected to the Car Computer 150, Near Field Communication between the Mobile Computer 130, and the Car Computer 150 or by other secure means. Once the Buyer's identity is verified, the information is communicated to the Server 120 that includes the date and time information and type of identity verification used. The Server 120 saves this information to the Showing Results Table 250 and transmits an instruction for the Car Computer 150 to unlock the car doors.

The Buyer 130a then can examine 455, both the inside and outside of the car. This examination may include using car entertainment systems. If the Car Computer 150 includes a camera, a picture or a video of the Buyer 130a may be captured and transmitted to the Server 120 where it is saved in the Showing Results Table 250.

Next, the Buyer 130a may request a test drive 360 for a set period of time or distance. An optional addition message and confirmation may be required by the Existing Owner. If a test drive is permitted, the Car Computer 150 will start the car. A navigational module of the Car Computer 150 then plots a test drive course for the set time or distance resulting in the car being returned to its current location. The Buyer 130a is then prompted to follow the test drive course. During the test drive, the Car Computer 150 constantly updates the car's position to the server where it is stored in the Showing Results Table 250. If the Buyer 130a deviates from the test drive course, an alert is displayed on the car computer. The alert indicates that if the Buyer 130a does not return to the test drive course, the car will be disabled, and their credit will be charged. If the Buyer returns to the test drive course, the test drive will continue. If the Buyer 130a does not return to the test course, the Car Computer 150 will disable the car once the car drops below a threshold speed. An alert will then be sent to the Existing Owner, and optionally, the police may be contacted. The Buyer's credit card would also be charged. Similar alerts, disabling, and charging of the Buyer's credit card may also be applied if the Buyer 130a operates the vehicle in an unsafe manner, such as exceeding the posted speed limit.

Assuming the Buyer 130a follows the test course and returns the car, the Buyer then locks the 465. An alert is then sent and received by the Existing Owner 350. The Car Computer 150 than transmits information including the duration of the showing and the test drive information to the Server 120 where the information is saved in the Showing Results Table 250.

The Buyer 130a is then prompted by the Mobile Computer 130 to review the car and indicate their likelihood of purchasing the car 470. This information is then transmitted to the Server 120 where it is saved in the Review Table 260.

Figure 5:
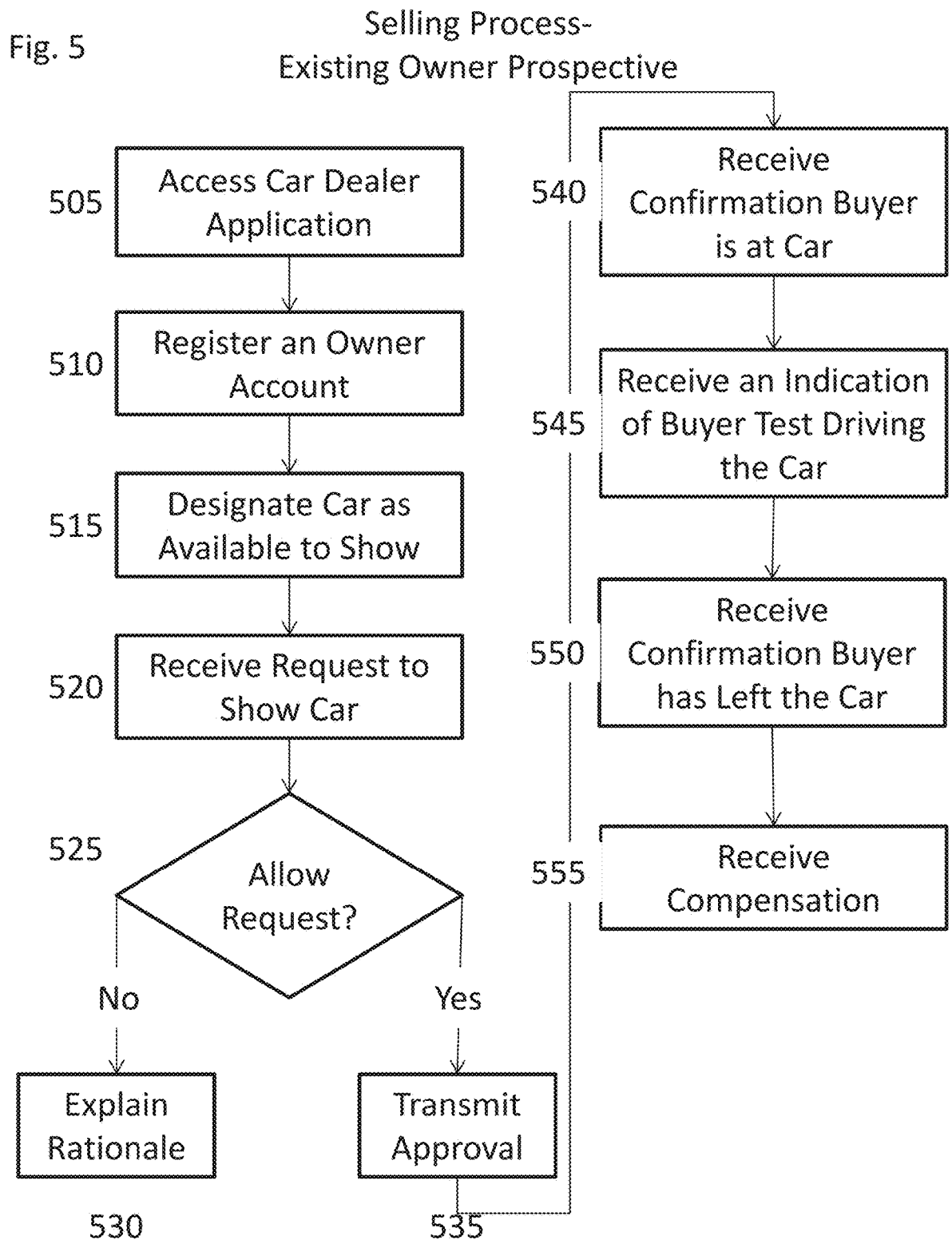
FIG. 5 is a block diagram of an example of the process of selling cars from the prospective of a Car Seller.

FIG. 5 shows the process for the Car Dealer 110 to sell the car to the Buyer 130a from the perspective of the Existing Owner.

First, the Existing Owner accesses 505 the Car Dealer Sales Application. This may be the same application as accessed by the Car Buyer or a different application. This application may be in the form of a website, web application, or an application that is downloaded and installed on a mobile device.

Next, the Existing Owner is required to register an Existing Owner Account 510. The Existing Owner is prompted to enter their basic biographic information and insurance information for the car. They may also be required to select how they would like to receive their credits. This information is then transmitted to the Server 120 where it is saved in the Existing Owner Table 230. Additionally, the Existing Owner may be prompted to enter information about their car including the Vehicle Identification Number (VIN), the installed option, and a photograph of the car. This information is then transmitted to the Server 120 where it is saved in Existing Owner Car Table 270. Step 510 may be skipped if the Existing Owner has already registered an Existing Owner Account.

The Existing Owner can then designate their car as being "Available for Show" 515. The Existing Owner can designate their car as being "Available for Show" from the Car Computer or by accessing the Car Dealer Sales Application. When a car is "Available for Show", this information is transmitted to the Server 120 where the information is stored in the Available for Show Table 240. This information is subsequently used to generate maps like those shown in FIG. 3.

When a Buyer requests a showing of the Existing Owner's car 455, the Existing Owner receives an alert. This alert may be in the form of an email message, SMS text message, an in app alert or the like. The Existing Owner has a predetermined period of time to permit or deny the request. A failure to respond may result in a deduction in credits. The Existing Owner must then decide to allow or deny the request 525.

If the Existing Owner elects to not allow the request to show the car, they must provide a rationale 430. This rationale could either be free input text box or be selected from a prepopulated dropdown list. The rationale may be used in determining the amount of credits to be deducted. This information is transmitted to the Server 120 where it is saved in one or more of the tables.

If the Existing Owner elects to allow the showing, the approval is transmitted to the Server 120 where it is subsequently received by the Mobile Computer 130 in step 440.

Next, if the showing is allowed, the Existing Owner receives an alert that the Buyer 130a is at the car 540. Then, if the Buyer 130a requests a test drive, an optional confirmation alert may also be sent to the Existing Owner. Further, if the Buyer 130a performs a test drive, the Existing Owner receives another alert indicating that a test drive has occurred. Finally, the Existing Owner receives an alert indicating that the showing has ended.

Based in part on the information stored in the Showing Results Table 250, the Existing Owner 555 may be awarded credits.

Figure 6:
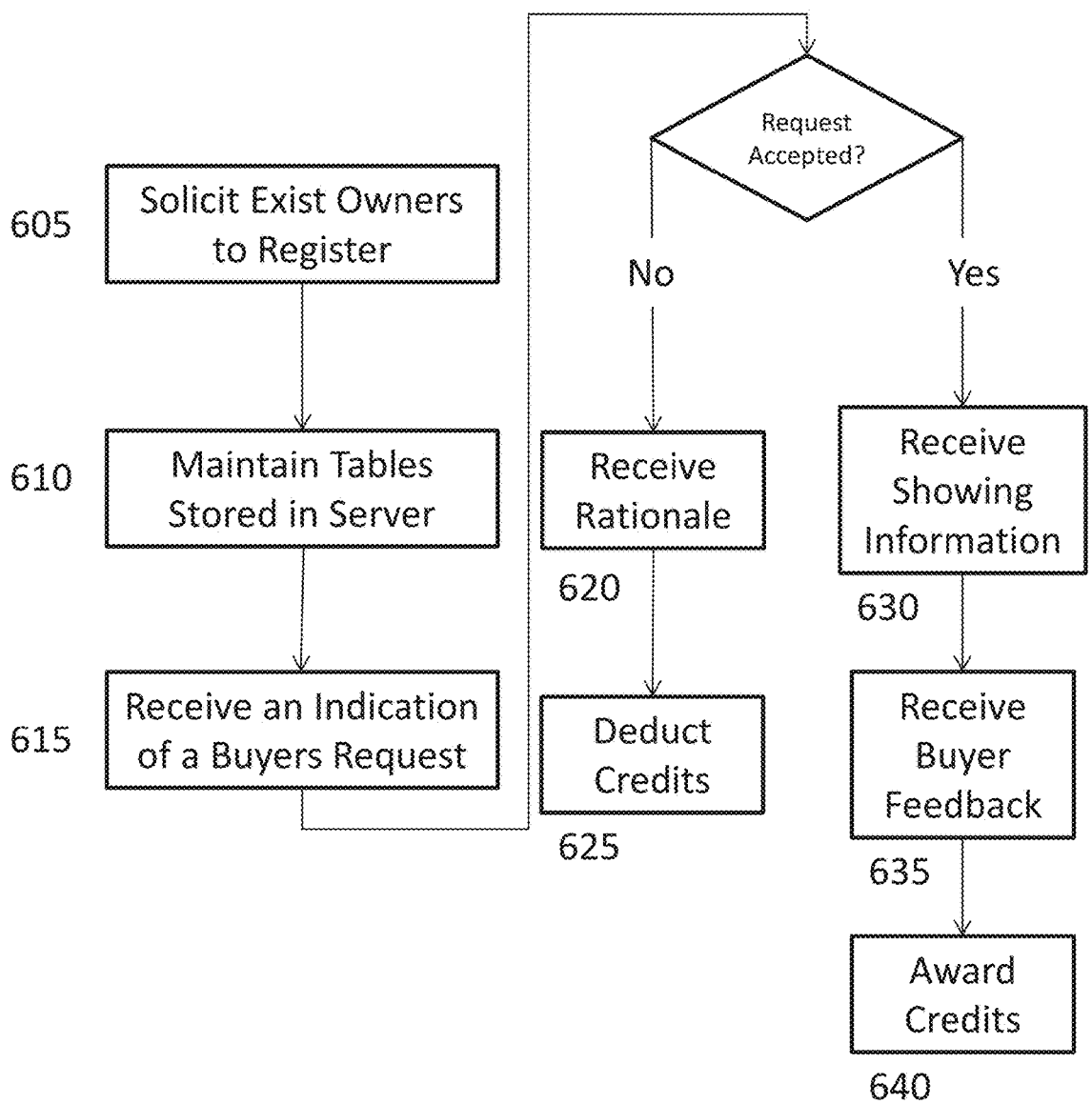
FIG. 6 is a map showing the cars "available for show" relative to the Consumer's current location.

FIG. 6 shows the process for the Car Dealer 110 to sell a car to the Buyer 130a from the perspective of the Car Dealer 110.

The Car Dealer 110 first solicits Existing Owners to Register 605. The Car Dealer may do this by direct marketing of existing customers or may include the registration as part of the initial sales. The solicitation asks the Existing Owners to complete the registration step 510.

The Car Dealer 110 is responsible for maintaining the tables 610 stored in the Server 120, such as those depicted in FIG. 2.

When a Buyer 130a requests a showing of a car 435, the Car Dealer 110 receives an alert. This alert may be in the form of an email message, SMS text message, an in app alert, or the like. This alert may also contain additional information retrieved from the Buyer Account Table 210 for the particular Buyer 130a requesting the showing.

If the Existing Owner does not allow the showing 525, the Car Dealer 110 receives an alert with the Existing Owner's Rationale 620 that was entered by the Existing Owner in step 530. The Dealer may then Deduct Credits from the Existing Owner 625. This deduction is then transmitted to the Server 120 which subsequently updates the Existing Owner Table 230.

If the Existing Owner allows the showing 525, the Car Dealer 110 receives an alert when the showing is completed. This alert may contain information from one or more of the tables stored in the Server 110. The Car Dealer 100 subsequently receives an alert 635 including the information entered by the Buyer 130a in step 470. Based in part on the information in the one or more tables, the Car Dealer may award credits 640 to the Existing Customer.

Figure 7:
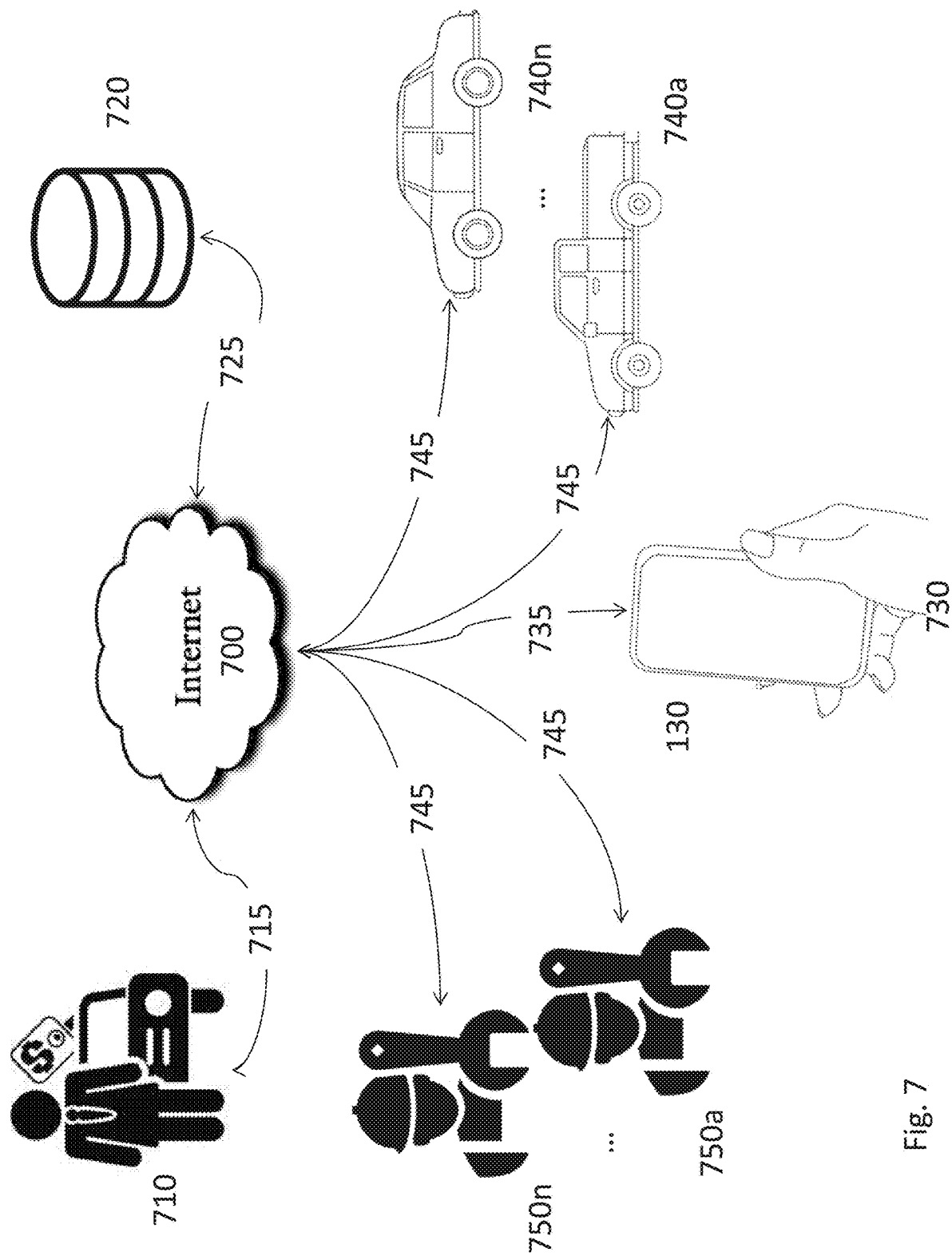
FIG. 7 is a diagram of an exemplary system practicing the process of repairing cars.

FIG. 7 depicts a diagram of an exemplary system practicing the method of servicing cars. In this system, a plurality of cars 740a . . . 740n each contain the Car Computer 150. A Server 720 is also connected to the Internet 100 via Communication Channel 725. In addition, a plurality of Independent Repair Centers 760a . . . 760n are connected to the Internet 100 via Communication Channel 765. An Existing Owner of a Car in Need of Service 730a has a Mobile Computer 730 that is connected to the Internet 100 via a Wireless Communication Channel 135.

Each of the Independent Repair Centers 760a . . . 760n has at least one Mobile Computer 130.

The Server 720 may be of any form known in the art. The Server includes an application that is capable of transmitting and receiving information with the Mobile Computer 630, the Car Computer 150, the Car Dealer 110 and the Independent Repair Centers 760a . . . 760n via the Internet 100. The Application is also capable of retrieving and storing information in one or more tables. The Server is capable of storing one or more data tables. In an embodiment, the Server 720 and the Server 120 are the same server.

Figure 8:
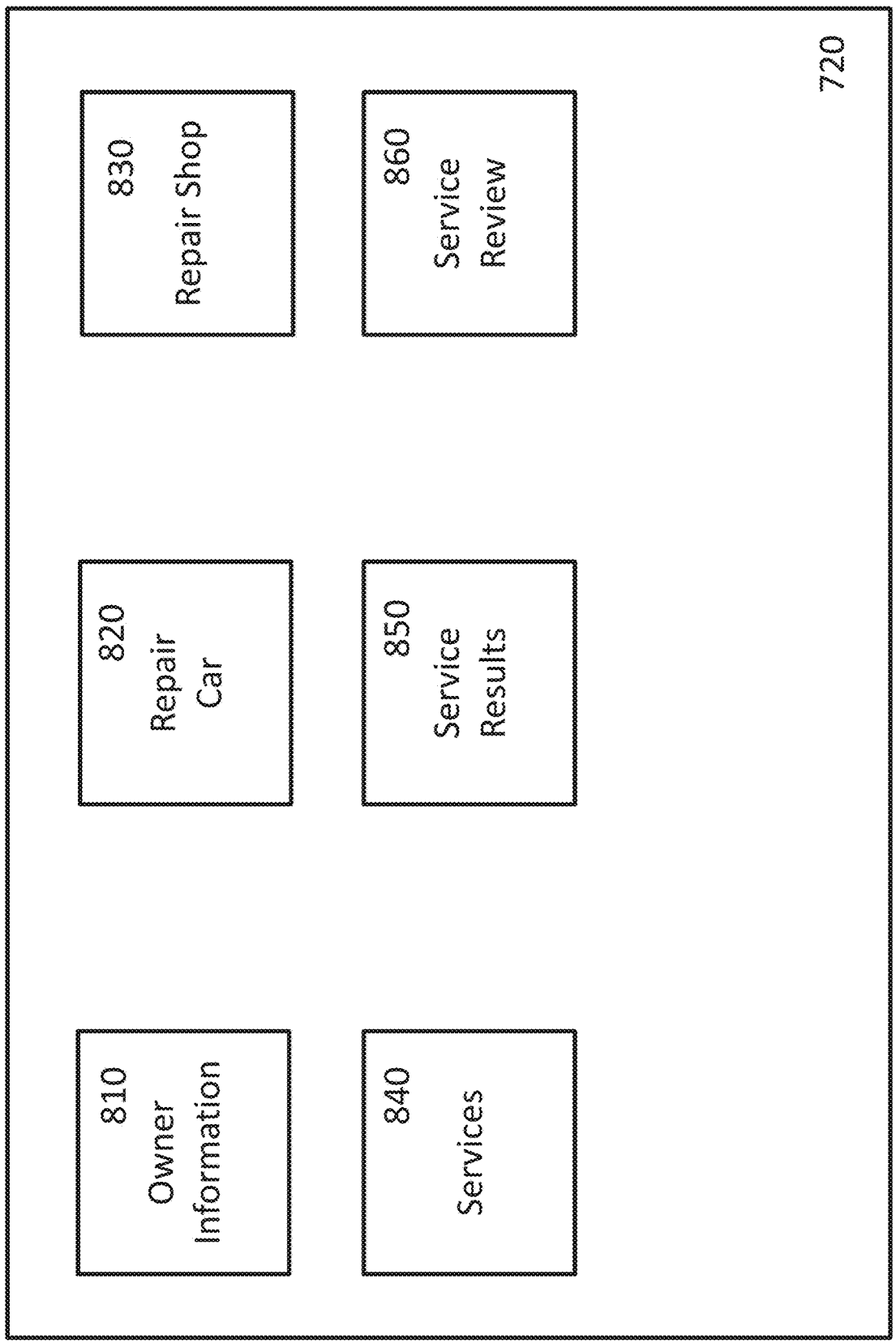
FIG. 8 is a block diagram of an example of the car service process from the prospective of an Existing Owner.

FIG. 8 is a graphical depiction of example tables that may be stored in the Server 720. Those tables may include an Owner Information Table 810, Repair Car Table 820, Repair Shop Table 830, Services Table 40, Service Results Table 850 and Service Review Table 860, The Owner Information Table 810 includes information about the Owner 730a of the vehicle. This information may include biographic information about the owner 730a, their credit card information, and insurance information. In addition, this information may include the current geographic position of the Mobile Computer 130.

The Repair Car Table 820 includes information on the repair history of a car. This information may include the date the car was serviced and the type of services provided. In addition, the Repair Car Table 820 may also include the manufacturer's suggested maintenance schedule for the car.

The Repair Shop Table 830 includes information on each of the plurality of Independent Service Centers 760a . . . 760n. This information may include biographic information for the service center, geographic location information, insurance information, and the types of services provided.

The Service Table 840 includes information on the type of services that are offered by the Car Dealer 110 to Owners of the cars. The services could, for example, include oil changes, tire rotation, brake service, etc.

The Service Results Table 850 includes information on the results of services rendered by the plurality of Independent Service Centers 760a . . . 760n on each car. This information may include the date and time that the car was picked up, the amount of time spent on the job, and the date and time when the car was returned.

The Service Review Table 860 includes information provided by the Car Owner 730a regarding their opinion of the services provided by the Independent Service Center.

FIG. 9 shows the process for the Car Dealer 110 to service the Owner's Car from the perspective of the Owner 730a.

First, the Car Owner 730a accesses the Car Dealer Service Application 905. The Car Dealer Service Application may be in the form of a website, web application, or an application that is downloaded and installed on the Mobile Computer 130. In an embodiment, the Car Dealer Service Application and the Car Dealer Sales Application are the same Application.

Next, the Car Owner 730a registers an Owner account 910. During this registration process, the Mobile Computer 130 prompts the Car Owner 730a to enter information. This information may include biographic information about the owner 730a, credit card information for the Car Owner 730a, and insurance information for the Car Owner 730a. This information is transmitted to the Server 720 where it is saved in the Owner Information Table 810. This step may be skipped if the Car Owner 730a has previously registered.

The Car Owner 730a selects 915 on the Mobile Computer 130 the service that the Car requires from a list. The list of services is based on the information stored in the Services Table 840. An alert is then transmitted and received by all of the Independent Service Centers 760a . . . 760n in step 1020 that can provide the selected service based on the information in one or more tables of the Server 720. The Independent Service Centers that receive the alert may be limited to centers within a predetermined distance from the geographic position of the Car Owner 730a based on information stored in the one or more tables of Server 720.

The Car Owner 730a then receives an offer 920 that was transmitted 1035 by one of the Independent Service Centers. The Car Owner 730a may elect to Accept the Service Offer 725.

If the Car Owner 730a does not accept the offer 725, the Mobile Computer prompts the Car Owner 730a to enter a rationale for rejecting the offer 930. This information may be entered in a free entry text book or by selecting from a prepopulated list. This information is transmitted to the server where it is stored in the Service Results Table 850.

If the Car Owner 730a accepts the offer, the approval is transmitted to the Independent Service Center 935.

The Car Owner 730a then receives a confirmation when a mechanic from the Independent Service Center retrieves the car 940. Another alert is sent to the Car Owner 730a when the service is completed 945. Finally, the Car Owner 730a receives an alert when a mechanic from the Independent Service Center 935 returns the car 950. The alerts may be in the form of an email message, SMS text message, an in app alert, or the like.

Next, the Car Owner 730a inspects the work performed on their car, and if it is acceptable, the Car Owner 730a approves the payment via the Mobile Computer 130. This information is transmitted to the Server 720.

Finally, the Car Owner 730a reviews the work provided. The information contained in the Car Owner 730a review is then transmitted to the Server 720 where it is saved in the Service Review Table 860.

FIG. 10 shows the process for the Car Dealer 110 to service the Owner's Car from the perspective of one of the Independent Service Centers 760a . . . 760n.

First, the Independent Service Center accesses the Car Dealer Service Application 905. The Car Dealer Service Application may be in the form of a website, web application, or an application that is downloaded and installed on a Mobile Computer 130.

Next, the Independent Service Center registers a Mechanic Account 1010. In this process, the Independent Service Center may be prompted to enter biographic information for the service center, geographic location information, and insurance information. The Independent Service Center is then prompted to enter one or more types of services provided 1015. This information is transmitted to the Server 720 where it is stored in the Repair Shop Table 830.

The Independent Service Center then receives 1020 a request transmitted from the Car Owner 730a. The Independent Service Center then has a predetermined period of time to Offer to Provide the Service 1025. The Independent Service Center may also receive additional information from the Repair Car Table.

If the Independent Service Center elects to not provide the service, they are prompted to explain their rationale 1030. This information is transmitted to the Server 720 where it is stored in one or more tables.

If the Independent Service Center elects to provide the service, an offer is transmitted 1035 to the Car Owner 730a and received by the Car Owner 730a in step 920.

The Car Owner 730a may elect to either accept or reject the offer to provide service 925.

If the Car Owner 730a elects to not receive the service from the Independent Service Center, the Independent Service Center receives an alert with the rationale entered by the Car Owner 730a in step 930.

If the Car Owner 730a elects to receive the service from the Independent Service Center, the Independent Service Center receives the location of the car 1035. A mechanic from the Independent Service Center then travels to the car.

The mechanic then uses the Mobile Computer 130 to unlock the car 1050. This process is functionally identical to the unlock process described with regard to unlock process of step 450. Once the car is unlocked, an alert is transmitted to the Car Owner 730a and received in step 940.

The mechanic is then able to start the car using the Mobile Computer 130 similar to that described with regard to step 460. The mechanic then transports the car to Independent Service Center 1060. Once the Car Computer 150 determines that the car has arrived at the Independent Service Center, an alert is sent to the Car Owner 730a and received in step 945. To determine that the car has arrived at the Independent Service Center, the Car Computer 150 may rely on information stored in one or more of the tables in Server 720.

The mechanics at the Independent Service Center then provide the service to the car 1070. One of the mechanics from the Independent Service Center returns the car 1080 to its original location. The mechanic may determine the original location based upon information provided by either the Car Computer 150 or the Mobile Computer 130.

Once the car is returned, the mechanic locks the car 1085 using the Mobile Computer 130. Once the car is located, an alert is sent to the Car 730a and received in step 950.

If the Car Owner approves payment 955, payment is received by the Independent Service Center 1090.

FIG. 11 shows the process for the Car Dealer 110 to service the Owner's Car from the perspective of one of the Car Dealer 110.

The Car Dealer 110 first solicits Independent Service Center to Register 1105. The solicitation asks the Independent Service Centers 760a . . . 760n to complete the registration step 1010.

The Car Dealer 110 is responsible for maintaining the tables 1110 stored in the Server 720, such as those depicted in FIG. 11.

The Car Dealer 110 receives an alert that a Car Owner 730a has requested service 1115. This alert may contain information about the Car Owner 730a retrieved from one or more of the tables stored in the Server 720.

Next, the Car Dealer 110 receives that one of the Independent Service Centers 760a . . . 760n has offered their service. Subsequently, the Car Dealer 110 receives an indication that the offer was either accepted or rejected by the Car Owner 730a in step 925.

If the offer to provide the service is not accepted by the Car Owner 730a, the Car Dealer 110 receives an alert 1125 that contains the rationale that the Car Owner 730a entered in step 930.

If the offer to provide the service is accepted by the Car Owner 730a, the Car Dealer 110 receives an alert when the car has been returned and locked in step 1085. The Car Dealer 110 receives payment 1135 from the Car Owner 730a after the work is approved. The Car Dealer 110 also receives feedback 1140 from the Car Owner 730a about the work provided by the Independent Service Center. Based in part on the provided feedback, the Car Dealer 110 provides payment 1145 to the Independent Service Center.

Although features and elements are described above in particular combinations, one of ordinary skill in the art will appreciate that each feature or element can be used alone or in any combination with the other features and elements. In addition, any of the steps described above may be automatically performed by either the Servers, Mobile Computers, or Vehicle Computers.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with the computer program may be used to implement the mobile Servers, Mobile Computers, or Vehicle Computers in physical or virtualized form.

What is claimed is:

1. A method, comprising:
    receiving, at a server, registration information about a vehicle that is available for showing;
    storing, in a memory of the server, the registration information about the vehicle in a table comprising registration information about a plurality of vehicles that are available for showing, wherein the vehicle and each vehicle of the plurality of vehicles are owned by different owners;
    receiving, at the server, geographic location information for each vehicle having registration information stored in the table;
    receiving, by the server, from a mobile computer of a prospective buyer, an indication of a first input to the mobile computer selecting a type of vehicle having registration information stored in the table;
    determining, by the server, a current geographic location of the mobile computer;
    determining, by the server, a mapped location of one or more vehicles matching the type of vehicle selected relative to the current geographic location of the mobile computer, wherein the mapped location is based on the geographic location information;
    causing, by the server, the mapped location of the one or more vehicles to be obfuscated as one or more shaded regions shown on a map displayed by the mobile computer;
    receiving, by the server from the mobile computer, an indication of a second input to the mobile computer selecting one shaded region of the one or more shaded regions shown on the map, the one shaded region including shading that obfuscates an exact geographic position of one vehicle of the one or more vehicles on the map;
    receiving, by the server from the mobile computer, a request for a showing of the one vehicle for the prospective buyer;
    receiving, at the server subsequent to receiving the request, a confirmation message that the showing of the one vehicle is allowed by an owner of the one vehicle;
    causing, by the server in response to receiving the confirmation message, removal of the shading in the one shaded region displayed by the mobile computer to reveal the exact geographic position of the one vehicle on the map displayed by the mobile computer;
    receiving, by the server from a vehicle computer associated with the one vehicle and subsequent to causing the shading to be removed in the one shaded region displayed by the mobile computer, verification information validating an identity of the prospective buyer when the prospective buyer is at the one vehicle;
    sending, by the server and in response to validating the identity of the prospective buyer, an instruction across a wireless communication network to unlock a door of the one vehicle;
    storing, in the memory of the server, information about the showing of the one vehicle to the prospective buyer; and
    adjusting, by the server and based on the information about the showing stored in the memory of the server, a credit value of a credit account by a credit amount, the credit account being stored in the memory of the server and associated with the owner of the one vehicle.

2. The method of claim 1, wherein after sending the instruction to unlock the door of the one vehicle, the method further comprises:

turning on the one vehicle using the mobile computer;

plotting, by the vehicle computer, a test drive route for the prospective buyer to follow during a test drive of the one vehicle;

determining, by the vehicle computer, whether the test drive route is followed by the prospective buyer during the test drive of the vehicle; and disabling, by the vehicle computer, an operability of the vehicle when the vehicle computer determines the test drive route is not followed by the prospective buyer during the test drive of the vehicle.

3. The method of claim 1, wherein adjusting the credit value of the credit account stored in the memory of the server comprises awarding the credit amount to the credit account when the one vehicle is shown a predetermined number of times.

4. The method of claim 1, wherein the vehicle computer is portable and connected to the one vehicle through a car communication port.

5. The method of claim 1, wherein adjusting the credit value of the credit account stored in the memory of the server comprises awarding the credit amount to the credit account based upon a number of test drives allowed by the owner of the one vehicle.

6. The method of claim 1, further comprising:

determining, by the server, a time duration that the one vehicle is available for showing, and wherein adjusting the credit value of the credit account stored in the memory of the server comprises awarding the credit amount to the credit account based upon the time duration.

7. The method of claim 1, further comprising:

receiving, from the mobile computer, an input of feedback from the prospective buyer regarding the showing of the one vehicle, and wherein adjusting the credit value of the credit account stored in the memory of the server comprises awarding the credit amount to the credit account based on the input of feedback from the prospective buyer.

8. The method of claim 1, wherein the owner of the one vehicle is provided with a predetermined period of time to provide the confirmation message, and the method further comprises:

deducting, by the server, a failure-to-respond credit amount from the credit account stored in the memory of the server and associated with the owner of the one vehicle when the predetermined period of time is exceeded.

9. The method of claim 1, further comprising:

deducting, by the server, a denial credit amount from the credit account stored in the memory of the server and associated with the owner of the one vehicle for each showing request that the owner of the one vehicle denies.

10. The method of claim 7, wherein adjusting the credit value of the credit account stored in the memory of the server comprises deducting the credit amount from the credit account when negative feedback is received.

11. A server, comprising:

a communications interface;

a processor coupled to the communications interface; and a memory coupled with and readable by the processor and storing therein instructions that, when executed by the processor, cause the processor to:

receive registration information about a vehicle that is available for showing;

store the registration information about the vehicle in a table comprising registration information about a plurality of vehicles that are available for showing, wherein the vehicle and each vehicle of the plurality of vehicles are owned by different owners;

receive geographic location information for each vehicle having registration information stored in the table;

receive, from a first mobile device of a prospective buyer, an indication of a first input to the first mobile device selecting a type of vehicle having registration information stored in the table;

determine, in response to receiving the indication of the first input, a current geographic location of the first mobile device;

determine a mapped location of one or more vehicles matching the type of vehicle selected relative to the current geographic location of the first mobile device, wherein the mapped location is based on the geographic location information;

cause the mapped location of the one or more vehicles to be obfuscated as one or more shaded regions shown on a map displayed by the first mobile device;

receive, from the first mobile device, an indication of a second input to the first mobile device selecting one shaded region of the one or more shaded regions shown on the map, the one shaded region including shading that obfuscates an exact geographic position of one vehicle of the one or more vehicles on the map;

receive, from the first mobile device, a request for a showing of the one vehicle for the prospective buyer;

receive, from a second mobile device of an owner of the one vehicle subsequent to receiving the request, a confirmation message that the showing of the one vehicle is allowed by the owner of the one vehicle;

cause, in response to receiving the confirmation message, removal of the shading in the one shaded region displayed by the first mobile device to reveal the exact geographic position of the one vehicle to the prospective buyer on the map displayed by the first mobile device;

receive, from a vehicle computer associated with the one vehicle and subsequent to causing the shading to be removed in the one shaded region displayed by the first mobile device, verification information validating an identity of the prospective buyer when the prospective buyer is at the one vehicle;

send, in response to validating the identity of the prospective buyer and via the communications interface across a wireless communication network, an instruction to unlock a door of the one vehicle;

store, in a memory location of the server, information about the showing of the one vehicle to the prospective buyer; and adjust, based on the information about the showing stored in the memory location of the server, a credit value of a credit account by a credit amount, the credit account being stored in the memory location of the server and associated with the owner of the one vehicle.

12. The server of claim 11, wherein adjusting the credit value of the credit account stored in the memory location of the server comprises awarding the credit amount to the credit account based upon a number of test drives allowed over time by the owner of the one vehicle.

13. The server of claim 11, wherein the instructions further cause the processor to:
  determine a time duration that the one vehicle is available for showing, and
  wherein adjusting the credit value of the credit account stored in the memory location of the server comprises awarding the credit amount to the credit account based upon the time duration.

14. The server of claim 11, wherein the owner of the one vehicle is provided with a predetermined period of time to provide the confirmation message via the second mobile device of the owner, and wherein the instructions further cause the processor to:
  deduct a failure-to-respond credit amount from the credit account stored in the memory location of the server and associated with the owner of the one vehicle when the predetermined period of time is exceeded.

15. The server of claim 11, wherein the instructions further cause the processor to:
  deduct a denial credit amount from the credit account stored in the memory location of the server and associated with the owner of the one vehicle for each showing request that the owner of the one vehicle denies.

16. The server of claim 11, wherein the instructions further cause the processor to:
  receive, from the second mobile device, an indication of feedback from the prospective buyer regarding the showing of the one vehicle.

17. The server of claim 16, wherein adjusting the credit value of the credit account stored in the memory location of the server comprises awarding the credit amount to the credit account based at least partially on the feedback from the prospective buyer.

18. The server of claim 16, wherein adjusting the credit value of the credit account stored in the memory location of the server comprises deducting the credit amount from the credit account when negative feedback is received.

19. A non-transitory computer readable medium storing therein instructions that, when executed by a processor, cause the processor to:
  receive registration information about a vehicle that is available for showing;
  store the registration information about the vehicle in a table comprising registration information about a plurality of vehicles that are available for showing, wherein the vehicle and each vehicle of the plurality of vehicles are owned by different owners;
  receive geographic location information for each vehicle having registration information stored in the table;
  receive, from a first mobile device of a prospective buyer, an indication of a first input to the first mobile device selecting a type of vehicle having registration information stored in the table;
  determine, in response to receiving the indication of the first input, a current geographic location of the first mobile device;
  determine a mapped location of one or more vehicles matching the type of vehicle selected relative to the current geographic location of the first mobile device, wherein the mapped location is based on the geographic location information;
  cause the mapped location of the one or more vehicles to be obfuscated as one or more shaded regions shown on a map displayed by the first mobile device;
  receive, from the first mobile device, an indication of a second input to the first mobile device selecting one shaded region of the one or more shaded regions shown on the map, the one shaded region including shading that obfuscates an exact geographic position of one vehicle of the one or more vehicles on the map;
  receive, from the first mobile device, a request for a showing of the one vehicle for the prospective buyer;
  receive, from a second mobile device of an owner of the one vehicle subsequent to receiving the request, a confirmation message that the showing of the one vehicle is allowed by the owner of the one vehicle;
  cause, in response to receiving the confirmation message, removal of shading in the one shaded region displayed by the first mobile device to reveal the exact geographic position of the one vehicle on the map displayed by the first mobile device;
  receive, from a vehicle computer associated with the one vehicle and subsequent to causing the shading to be removed in the one shaded region displayed by the first mobile device, verification information validating an identity of the prospective buyer when the prospective buyer is at the one vehicle;
  send, in response to validating the identity of the prospective buyer and via a communications interface across a wireless communication network, an instruction to unlock a door of the one vehicle;
  store, in a memory, information about the showing of the one vehicle to the prospective buyer; and
  adjust, based on the information about the showing stored in the memory, a credit value of a credit account by a credit amount, the credit account being stored in the memory and associated with the owner of the one vehicle.

20. The non-transitory computer readable medium of claim 19, wherein the instructions further cause the processor to:
  receive, from the second mobile device, an indication of feedback from the prospective buyer regarding the showing of the one vehicle,
  wherein adjusting the credit value of the credit account stored in the memory comprises awarding the credit amount to the credit account based at least partially on the feedback from the prospective buyer.

* * * * *